United States Patent
Shanmugam et al.

(10) Patent No.: US 10,732,764 B1
(45) Date of Patent: Aug. 4, 2020

(54) INTEGRATED TOUCH CONTROL ELECTRODE AND ANTENNA

(71) Applicant: Amazon Technologies, Inc., Seattle, WA (US)

(72) Inventors: Balamurugan Shanmugam, San Jose, CA (US); Sandeep Vuppu, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 9 days.

(21) Appl. No.: 16/122,118

(22) Filed: Sep. 5, 2018

(51) Int. Cl.
*G06F 3/041* (2006.01)
*G06F 3/044* (2006.01)

(52) U.S. Cl.
CPC .......... *G06F 3/0416* (2013.01); *G06F 3/0443* (2019.05); *G06F 3/0446* (2019.05)

(58) Field of Classification Search
CPC ....... G06F 3/0416–04186; G06F 3/041; G06F 3/044–0448
See application file for complete search history.

(56) References Cited

U.S. PATENT DOCUMENTS

| | | | | |
|---|---|---|---|---|
| 8,432,322 B2* | 4/2013 | Amm | ...................... | H01Q 1/243 343/702 |
| 8,577,289 B2* | 11/2013 | Schlub | ................... | G01B 7/023 343/702 |
| 8,681,057 B2* | 3/2014 | Jung | ...................... | H01Q 1/243 343/702 |
| 9,184,502 B2* | 11/2015 | Yang | ...................... | H01Q 1/2266 |
| 9,600,126 B2* | 3/2017 | Kitamura | .............. | G06F 3/0416 |
| 10,186,754 B2* | 1/2019 | Yang | ...................... | H01Q 1/2266 |
| 10,235,869 B2* | 3/2019 | Yamamoto | ............. | G08C 17/02 |
| 10,241,631 B2* | 3/2019 | Chai | ....................... | G06F 3/044 |
| 2009/0315858 A1* | 12/2009 | Sato | ....................... | G06F 3/0416 345/174 |
| 2011/0012793 A1* | 1/2011 | Amm | ...................... | H01Q 1/243 343/702 |
| 2011/0298670 A1* | 12/2011 | Jung | ...................... | H01Q 1/243 343/702 |
| 2012/0214412 A1* | 8/2012 | Schlub | .................. | G01B 7/023 455/41.1 |
| 2014/0111474 A1* | 4/2014 | Bytheway | .............. | G06F 3/044 345/174 |

(Continued)

*Primary Examiner* — Patrick F Marinelli
(74) *Attorney, Agent, or Firm* — Quarles and Brady LLP

(57) ABSTRACT

A device includes a substrate and a touch control interface including touch control electrodes laminated onto the substrate and a touch controller electrically connected to each touch control electrode. The touch controller is configured to detect a change in a capacitance of a first touch control electrode to determine that a user is touching the first touch control electrode. The device may include a high-pass filter connected to the first touch control electrode and an impedance matching network electrically connected to the high-pass filter. The device includes a radio controller connected to the impedance matching network. The radio controller is configured to use the first touch control electrode as a first antenna to transmit and receive wireless signals. The optional impedance matching network may be configured to match an input impedance of the first touch control electrode to an output impedance of the radio controller.

16 Claims, 10 Drawing Sheets

(56) References Cited

U.S. PATENT DOCUMENTS

| | | | |
|---|---|---|---|
| 2015/0062077 A1* | 3/2015 | Kitamura | G06F 3/0416 |
| | | | 345/174 |
| 2015/0138144 A1* | 5/2015 | Tanabe | G06F 3/045 |
| | | | 345/174 |
| 2017/0090669 A1* | 3/2017 | Paladugu | G06F 3/0418 |
| 2017/0122618 A1* | 5/2017 | Yamamoto | G08C 17/02 |
| 2018/0069549 A1* | 3/2018 | Cooper | H03K 17/955 |
| 2018/0188838 A1* | 7/2018 | An | G06F 3/0416 |
| 2018/0275789 A1* | 9/2018 | Chai | G06F 3/044 |
| 2018/0301106 A1* | 10/2018 | Huang | G09G 3/3688 |
| 2019/0036208 A1* | 1/2019 | Yamagishi | G06F 3/046 |
| 2019/0181539 A1* | 6/2019 | Lee | H01Q 1/243 |

* cited by examiner

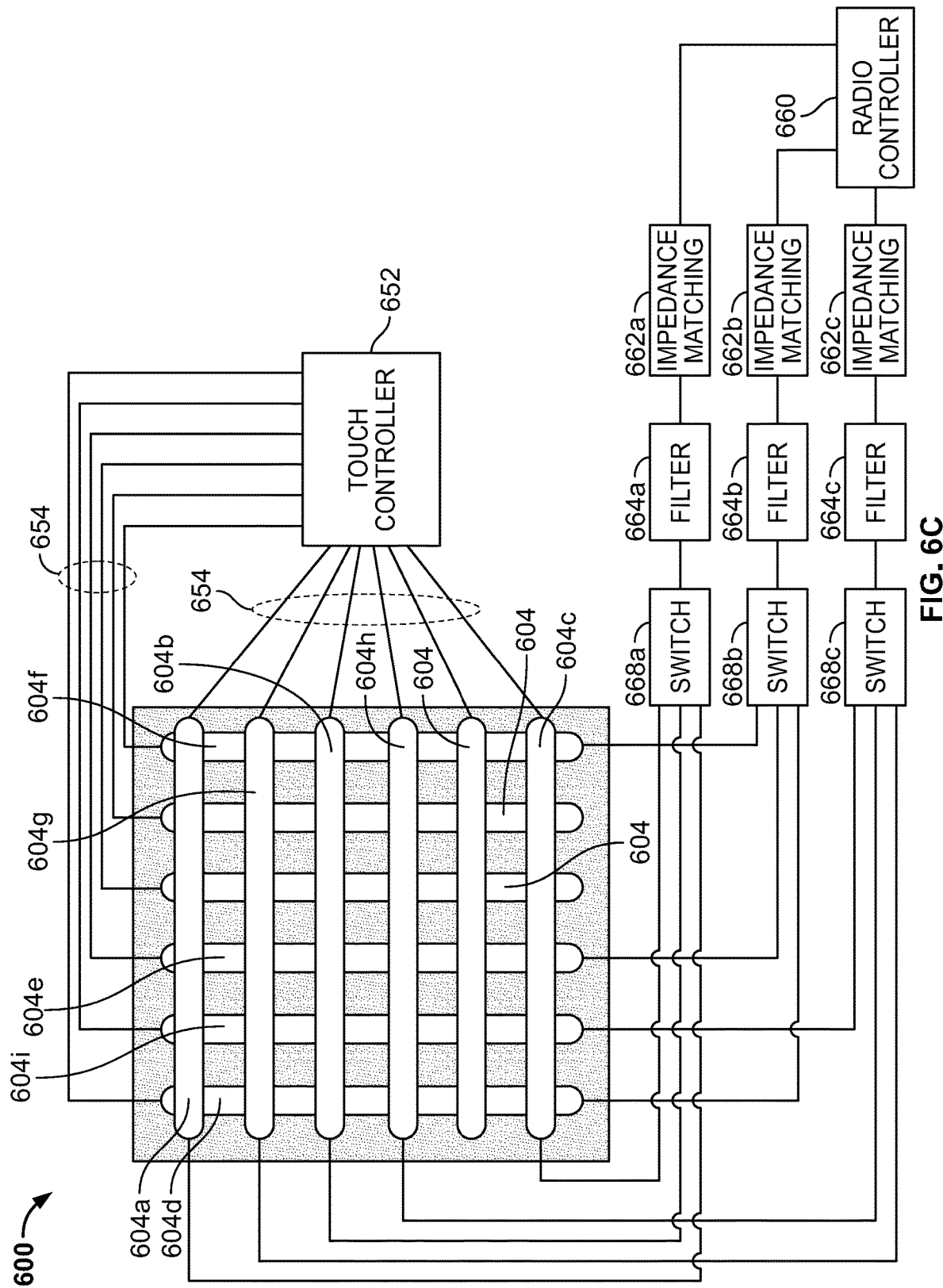

INTEGRATED TOUCH CONTROL ELECTRODE AND ANTENNA

BACKGROUND

The present invention relates generally to the field of electronic devices and, more particularly, to touch control interfaces and wireless communication systems for use in such devices. An increasing number of devices are configured to connect to networks in order to exchange information. Typical devices includes one or more antennas made from a conductive material. A wireless communication processor is connected to the antennas and transmits and receives wireless communication signals through the one or more antennas. Such devices may also include control interfaces that enable a user to interact with the device. Example interfaces may include touch control surfaces. Touch control surfaces include one or more touch control electrodes that are each connected to a touch controller. The touch controller is configured to detect a user touching (e.g., with a finger or stylus) one of the electrodes. Upon detecting such a touch event, the device's main processor can take an appropriate action.

When designing a device that includes both a wireless communication systems and a touch control interface, it can be important to provide sufficient isolation between the conductive materials of the device's antennas and the touch control electrodes. These design requirements can increase the overall size of such electronic devices and, where such design requirements result in implementation tradeoffs, reduce device performance.

BRIEF DESCRIPTION OF THE DRAWINGS

The detailed description is set forth with reference to the accompanying figures. The use of the same reference numbers in different figures indicates similar or identical items or features.

FIGS. 6A-6C are illustrations of a touch control interface including overlapping touch control electrodes and related system in which multiple touch control electrodes can operate as an antenna of a wireless communication system.

DETAILED DESCRIPTION

Figure 1:
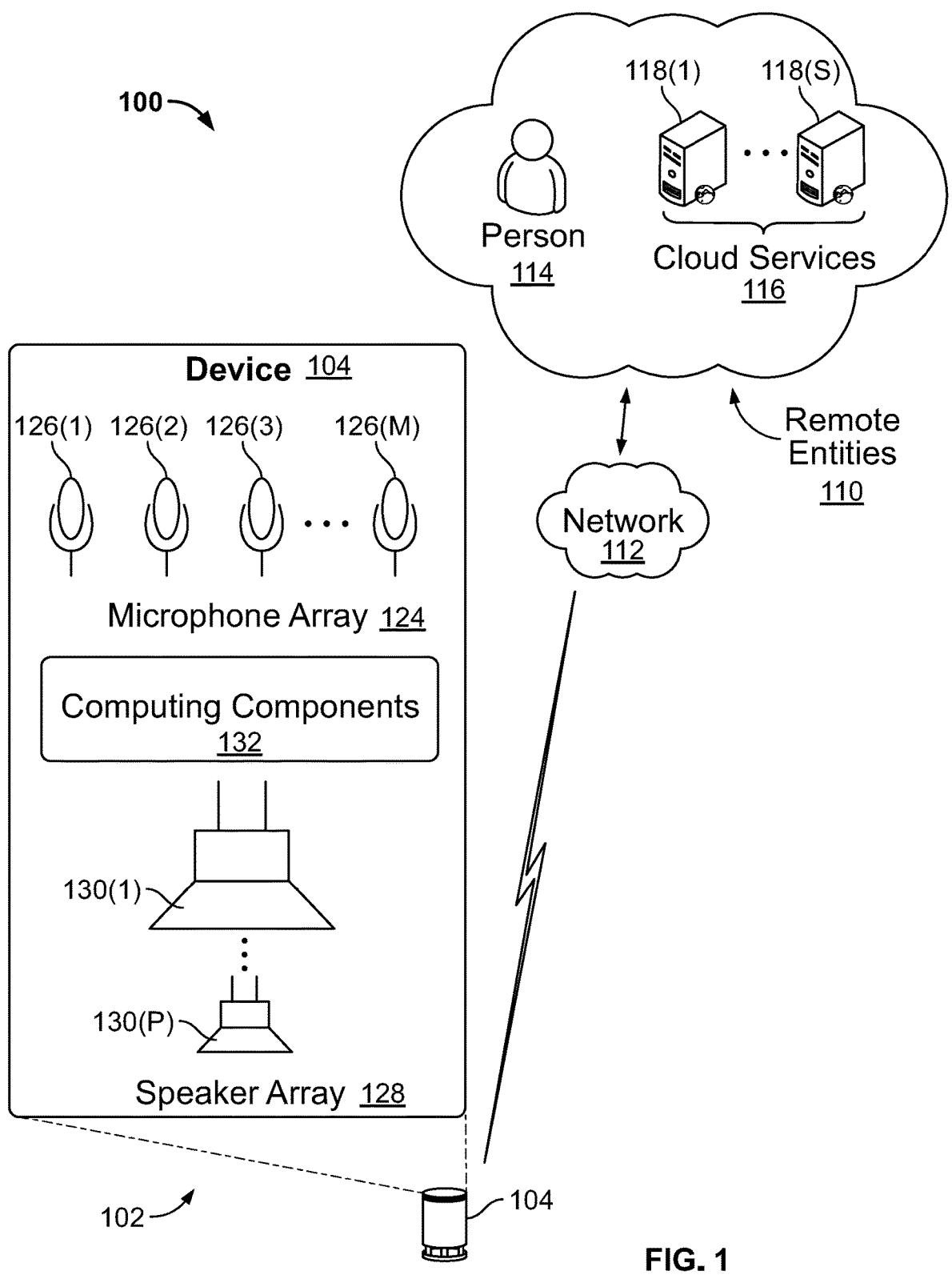
FIG. 1 depicts an exemplary environment including a device incorporating a communication subsystem and touch control interface configured in accordance with the present disclosure.

An electronic device may include a wireless communication system as well as touch control interfaces incorporated into the housing of the device. The wireless communication system enables the device to send and receive data signals to and from one or more wireless networks and computer systems connected thereto. Such communications can enable functionality of the device by enabling the device to retrieve information and content from the remote computer systems and output that information and content to a user of the electronic device. Touch control interfaces may be incorporated into the device's housing and allow a user to provide an input to the device (e.g., to turn the device on or off or change the device's output volume) by touching or moving a finger along the touch control interface.

In an electronic device, the wireless communication system enables the transmission and reception of data. Electronic devices, such as a network-connected speaker or smart phone device, may communicate (e.g., using wireless fidelity (WIFI) and BLUETOOTH communication protocols) with remote devices via a network. To facilitate wireless communications using a particular communication protocol, a device may include a number of antennas. If the device includes two or more antennas, the antennas can be distanced apart from one another and may have different orientations within the device so as to provide diversity between the antennas. As such, if one antenna is not well-positioned to receive and/or transmit wireless communications to a remote device or access point (e.g., a connected wireless router or modem), there is a reasonable likelihood that another antenna within the device is better positioned for such communications.

Touch control interfaces may be incorporated into or connected to the housing of the electronic device. Touch control interfaces typically include a number of control surfaces or electrodes that include conductive materials. Each control electrode in the interface is electrically isolated from one another, and is connected to a touch controller or processor. As a user's finger comes into contact with or nearby a control electrode of the touch control interface, the presence of the user's finger changes a capacitance of the control electrode. That changing capacitance is detected by the touch controller. In turn, the touch controller transmits a message to a processor of the device indicating that the user is touching the control electrode. The processor can then take an appropriate action, such as changing the device's output volume, turning the device on or off, and the like.

In conventional electronic devices, the control electrodes of the device's touch control interface must be electrically isolated from the device's antennas. Typically, this requires that the antenna and control electrode structures be physically separated from one another. These separation requirements can result in device configurations that are larger than desired because a larger configuration is required to achieve the necessary physical separation. In some cases, certain elements of the device, such as the control electrodes of the touch control interface may be required to be smaller than desired to accommodate the device's antenna structures. This can detract from the usability of the device by reducing the size of the device's control interfaces.

In the present electronic device, the conductive elements or surfaces of the touch control interface (i.e., the touch control electrodes) are used for both touch detection and as antennas for the device's wireless communication system. In this configuration, relatively low frequency signals (e.g., on the order of kilohertz KHz) injected by the touch controller into the control surfaces and potential harmonic signals generated those relatively low frequency signals are filtered from higher frequency signals (e.g., on the order of megahertz (MHz) or gigahertz (GHz)) that are received or transmitted through the same control electrode by the device's wireless communication system. By filtering the signals injected by the touch controller into a control electrode from the wireless communication system signals, the touch control interface and the wireless communication can use the same control electrode as both a touch sensor and an antenna.

By using a single control electrode to operate as a touch sensor as well as an antenna (i.e., combining the functionality of an antenna and touch control electrode) it can be possible to simplify the design of the electronic device, eliminating the need for two discrete components. This, in turn, can save space requirements inside the device as there is no longer a requirement for geometrical isolation between the touch sensor electrodes and antennas.

In some embodiments, multiple different conductive control surfaces in the touch control interface may be electrically connected to the device's wireless communication system and may be useable by that system as antennas. In that case, the wireless communication system may select one control surface or another for the transmission and reception of wireless transmissions. In that case, to further minimize the likelihood of interference, if the touch controller determines that the user is touching a first control electrode of the touch control interface that is also configured as one of the antennas of the wireless communication system, the wireless communication system can be configured to use a second control electrode of the touch control interface that is configured as an antenna for communications. Typically, in such an implementation the first control electrode is spaced apart from the second control electrode so that the user's finger (which is positioned near the first control electrode) will not tend to interfere with wireless transmissions originating from or being transmitted into the second control electrode.

FIG. 1 shows an illustrative architecture 100, set in an exemplary environment 102, which includes a device 104 that can incorporate a communication subsystem and touch control interface configured in accordance with the present disclosure. Specifically, the communication subsystem and touch control interface may be configured to utilize the same control surface as antennas and touch sensors.

Device 104 may be positioned in any number of locations (e.g., ceiling, wall, in a lamp, beneath a table, on a work desk, in a hall, under a chair, etc.) within the environment 102. Device 104 is configured to communicatively couple to a number of remote entities 110 over a network 112. The remote entities 110 may include individual people, or automated and remote computer systems (not shown) that can interact with device 104. In some embodiments, remote entities 110 may comprise cloud services 116 hosted, for example, on one or more servers 118(1) ... 118(S). These servers 118(1)-(S) may be arranged in any number of ways, such as server farms, stacks, and the like that are commonly used in data centers.

The cloud services 116 generally refer to a network accessible platform implemented as a computing infrastructure of processors, storage, software, data access, and so forth that is maintained and accessible via a network such as the Internet. Cloud services 116 do not require end-user knowledge of the physical location and configuration of the system that delivers the services. Common expressions associated with cloud services include "on-demand computing", "software as a service (SaaS)", "platform computing", "network accessible platform", and so forth.

The cloud services 116 may host any number of applications that can process input received from device 104, and produce a suitable response. Example applications might include web browsing, online shopping, banking, email, work tools, productivity, entertainment, educational, and so forth.

A user can communicate with remote entities 110 via device 104. For example, device 104 may output an audible question, "What do you want to do?" This output may represent a question from a far end talker 114, or from a cloud service 116 (e.g., an entertainment service). The user can then respond by stating a response.

Device 104 is equipped with an array 124 of microphones 126(1) ... 126(M) to receive the voice input from the user. The microphones 126(1)-(M) are generally arranged at a first or top end of device 104. Although multiple microphones are illustrated, in some implementations, device 104 may be embodied with only one microphone.

Device 104 may further include a speaker array 128 of speakers 130(1) ... 130(P) to output sounds. Speakers 130(1)-(P) may be configured to emit sounds at various frequency ranges, so that each speaker has a different range. In this manner, device 104 may output high frequency signals, mid frequency signals, and low frequency signals.

Device 104 may further include computing components 132 that process voice inputs received by microphone array 124, enable communication with the remote entities 110 over the network 112, and generate audio to be output by speaker array 128. Computing components 132 are generally positioned between microphone array 124 and speaker array 128, although essentially any other arrangement may be used. One collection of computing components 132 are illustrated and described with reference to FIG. 2.

Figure 2:
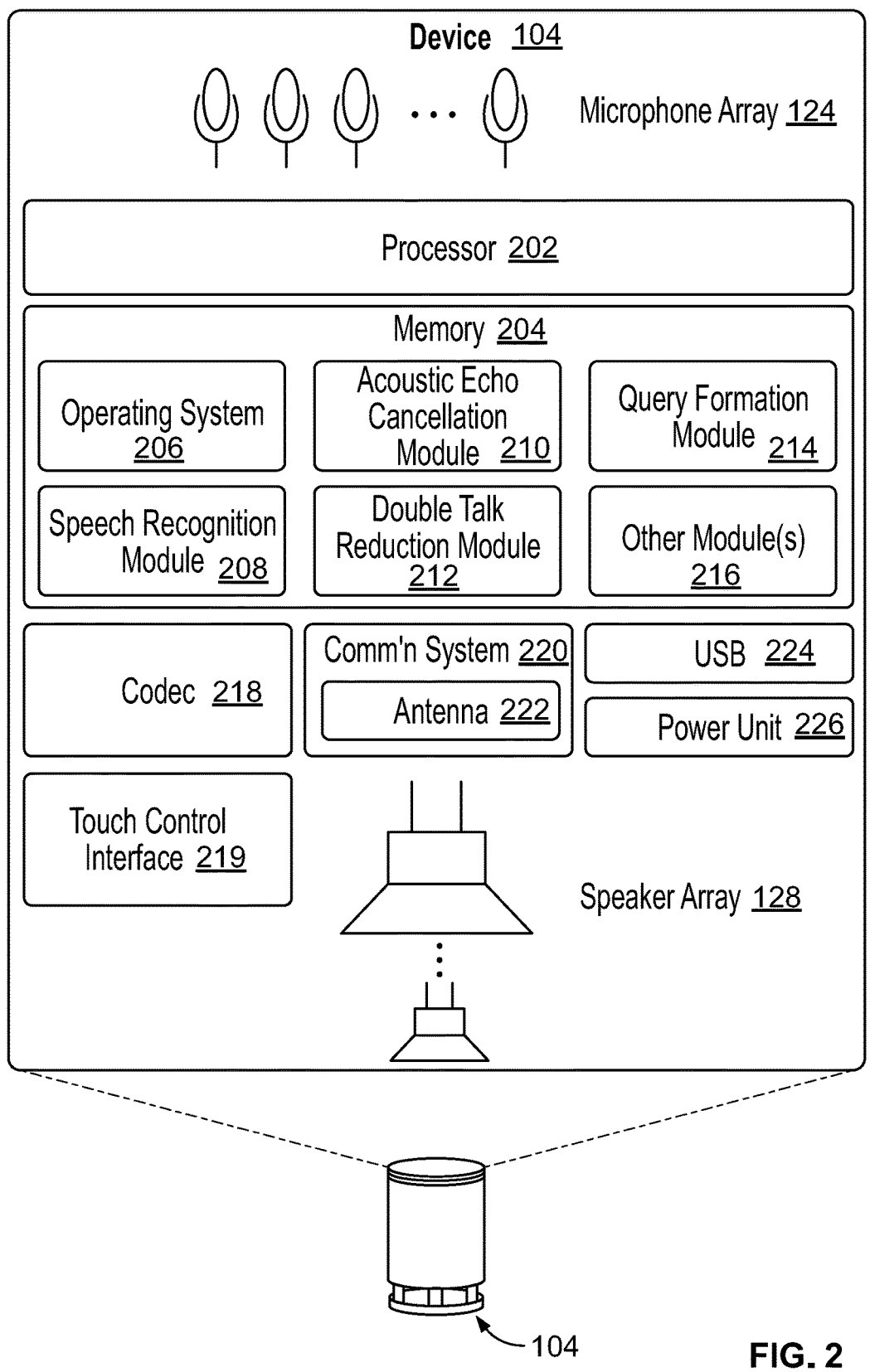
FIG. 2 illustrates example components of an example electronic device that can be used in accordance with various embodiments.

FIG. 2 shows selected functional components of device 104 in more detail. Device 104 may be implemented with the ability to receive and output audio, a network interface (wireless or wire-based), power, and processing/memory capabilities. In the illustrated implementation, device 104 includes microphone array 124, speaker array 128, processor 202, memory 204, and touch control interface 219.

Memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and that can be accessed by processor 202.

Several modules such as instructions, data stores, and so forth may be stored within the memory 204 and configured to execute on processor 202. An operating system module 206 is configured to manage hardware and services (e.g., wireless unit, USB, Codec) within and coupled to device 104 for the benefit of other modules. Several other modules may be provided to process verbal input from the user. For instance, a speech recognition module 208 provides some level of speech recognition functionality.

An acoustic echo cancellation module 210 and a double talk reduction module 212 can be provided to process the audio signals to substantially cancel acoustic echoes and substantially reduce double talk that may occur. These modules may work together to identify times where echoes are present, where double talk is likely, where background noise is present, and attempt to reduce these external factors to isolate and focus on the near talker.

A query formation module 214 may also be provided to receive the parsed speech content output by the speech recognition module 208 and to form a search query or some form of request. This query formation module 214 may utilize natural language processing (NLP) tools as well as various language modules to enable accurate construction of queries based on the user's speech input.

Device 104 might further include a codec 218 coupled to the microphones of the microphone array 124 and the speakers of the speaker array 128 to encode and/or decode the audio signals. The codec 218 may convert audio data between analog and digital formats.

Device 104 includes a wireless communication system 220 coupled to an antenna system 222 (which may include one or more separate antenna components) to facilitate a wireless connection to a network or one or more other remote components configured to communicate with device 104. Wireless communication system 220 may implement one or more of various wireless communication protocols, such as WIFI, BLUETOOTH, ZIGBEE, and so on.

Device 104 includes touch control interface 219 that includes a number of touch control electrodes mounted to or otherwise incorporated into a housing of device 104. A touch controller or processor (not shown) is configured to detect an object (e.g., a user's finger or a stylus) touching or in close proximity to one or more of the touch control electrodes. Upon detecting a touch event, the controller can transmit a message to processor 202 indicating which touch control electrode was touched by the user. Processor 202 can then cause device 104 to take an appropriate action. For example, touch control interface 219 may include a number of touch control electrodes, where each electrode is associated with a particular device 104 output volume. In that case, the user can select a desired output volume by touching a particular control surface in the touch control interface 219. In this manner, a number of different control electrodes may be arranged in the configuration of a slider so that as the user slides his or her finger along the control surfaces, the output volume of device 104 may be adjusted accordingly.

In other embodiments, touch control interface 219 may enable a user to control different device 104 functions. For example, a touch control electrodes may be associated with toggling device 104 between a power on state and a stand by state. In that case, a user can power on device 104 by touching the touch control electrode. A subsequent touch to the touch control electrode may return device 104 to a stand by or power-off mode.

USB port 224 may further be provided as part of device 104 to facilitate a wired connection to a network, or a plug-in network device that communicates with other wireless networks. In addition to USB port 224, or as an alternative thereto, other forms of wired connections may be employed, such as a broadband connection, and connected to device 104 using one or more additional modules 216 that may be utilized for data transfer. A power unit 226 is further provided to distribute power to the various components of device 104.

Device 104 supports audio interactions with the user, in the form of receiving voice commands (e.g., words, phrase, sentences, etc.) from the user and outputting audible feedback to the user.

Touch control interface 219 of device 104 includes a touch control interface that incorporates one or more touch control electrodes configured to detect a touch event (e.g., a user bringing an object, such as a finger, into contact with or close proximity to a touch control electrode. The one or more touch control electrodes of the touch control interface include a conductive material (e.g., copper or aluminum) that are generally affixed to or otherwise incorporated into the housing of device 104. The touch control electrodes are positioned so as to be accessible to the user, enabling the user to touch the one or more touch control electrodes.

In some cases, to facilitate user interactions with the touch control electrodes of the touch control interface, instructions and guides may be printed or otherwise rendered over the touch control electrodes or the housing of device 104 in proximity to the touch control electrodes. The instructions may provide useful cues as to how the user is to interact with the touch control interface 219 and how such interaction will affect the operation of device 104 (e.g., by controlling an output volume of device 104 or powering on or off device 104). This may be particularly useful if the control surfaces are the same color as the housing of device 104—in some cases the control surfaces may be painted or otherwise covered in pigment—which may make the control surfaces of touch control interface 219 difficult to see or identify.

Depending upon the implementation, touch control interface 219 may use any suitable approach, technique, or algorithm, for detecting touches upon the one or more touch control electrodes of touch control interface 219.

In some cases, the touch control electrodes of touch control interface 219 may be implemented as force or pressure sensors configured to detect a user's finger pressing against the control surfaces. In that case, each touch control electrodes may be configured as a portion of a separate switch. As the user presses upon one of the touch control electrodes, the switch associated with that control electrode closes. A touch controller connected to the switch detects that the switch has closed (e.g., by the impedance of the switch transitioning from a high value, associated with an open circuit, to a lower value, associated with a short circuit). Upon detecting that the switch has closed, it may be determined that the touch control electrode associated with that switch has been touch or pressed and an appropriate action can be taken by the touch controller. For example, the touch controller may notify processor 202 that the touch control electrode has been touched. Based upon the identity of the touch control electrode, processor 202 can take an appropriate action associated with that control electrode.

In a switch-based configured of touch control interface 219, the switches associated with each touch control electrode may be a mechanical switch in which a flexing or movement of a control electrode in response to a user's touch causes the switch associated with the control electrode to close.

Alternatively, touch control interface 219 may be implemented as a resistive touch sensor. In such a configuration, a touch control electrode of touch control interface 219 consists of two conductive layers separated by small spacers (e.g., non-conductive dots positioned between the two conductive layers). The conductive layers are made up of conductive or metallic films laminated over the inner surfaces of two substrate (e.g., glass or polymer) layers. When a probe like a finger, stylus pen, pen, etc. is used to apply pressure on the top substrate of the control electrode, the top film flexes inward and makes contact with the bottom film. This results in a voltage drop across the two conductive films. This voltage drop can be detected by a touch controller as a touch event on the touch control electrode.

In an embodiment, touch control interface 219 is implemented as a capacitance touch sensor. When implemented as a capacitance touch sensor, control interface 219 monitors changing capacitances (i.e., the ability to store charge) of the interface's touch control electrodes to detect touch events.

In its simplest form, a capacitor is composed of two conductors (i.e., metal plates) separated by an insulator. In such an arrangement, the capacitance of the capacitor is at least partially determined by the area of the conductive or metal plates and the distance between the plates. Specifically, the capacitor's capacitance is directly proportional to the area of the conductive plates and inversely proportional to the distance between the plates.

Figure 3:
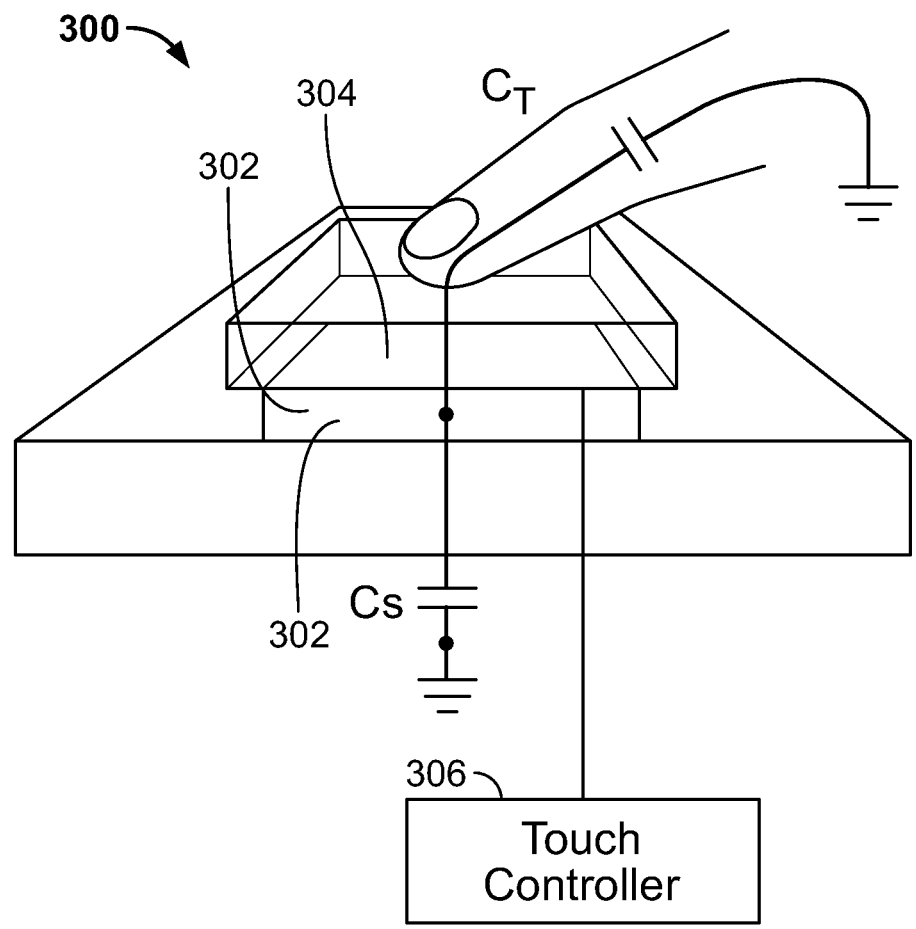
FIG. 3 is a cross-sectional view of the touch control electrode of an example touch control interface.

FIG. 3 is a cross-sectional view of an example capacitance-based touch sensor that may be utilized by touch control interface 219 of device 104. Sensor 300 includes electrode 302, which may represent one of the control surfaces of touch control interface 219. Electrode 302 includes a conductive material, such as copper or aluminum. Insulating layer 304, which may include a plastic, polymer, or other electrically insulative material, is formed over electrode 302 and operates as a protective overlay for electrode 302. In various embodiments of touch sensor 300, insulating layer 304 may be optionally removed from sensor 300 without inhibiting the operation of sensor 300. Touch controller 306 is connected to electrode 302 and is configured to measure a capacitance of a capacitor that, as described below, incorporates electrode 302 as one of the conductive plates of the capacitor.

In a capacitive touch sensor configuration, electrode 302 represents one of the plates of a capacitor. The second plate of the capacitor is represented by two objects: one is the substrate over which electrode 302 is formed, which forms a parasitic sensor capacitance $C_S$ and the other is, if present, a conductive object like human finger or stylus that may be in contract with or nearby electrode 302 and forms touch capacitance $C_T$.

Electrode 302 is connected to touch controller 306, which is configured to measure the capacitance of electrode 302 periodically. The capacitance value measured by touch controller 306 will increase if a conductive object touches or approaches the electrode 302 forming touch capacitance $C_T$. In the absence of such a conductive object proximate to electrode 302, touch controller only measures the parasitic capacitance $C_S$. Accordingly, when a conductive object, such as a user's finger, is brought into close proximity to electrode 302, touch controller 306 can detect a change in the measured capacitance of electrode 302, which indicates that sensor 300 has been touched.

The sensitivity of sensor 300 can be at least partially determined by the area of electrode 302 and the thickness of insulating layer 304. Generally, as the area of electrode 302 increases, and the thickness of insulating layer 304 is reduced, the magnitude of touch capacitance $C_T$ increase (when an object is present in proximity to electrode 302), while the parasitic capacitance $C_S$ does not change. As the potential magnitude of $C_T$ increases, the measured capacitance difference when a finger is not present on sensor 300 versus a finger being present is larger making detection easier and sensor 300 more sensitive.

Touch controller 306 can use any suitable technique to measure the capacitance at electrode 302, such amplitude modulation detection, frequency modulation analysis, or time delay measurements.

In frequency modulation analysis, touch controller 306 passes an oscillating signal through electrode 302. Typically the signal has a known frequency in the range of 1 KHz to 100 KHz. As the signal passes through electrode 302, however, the frequency of the inputted signal is modified due to the capacitance of electrode 302. Touch controller 306 can measure the change in frequency of the signal passing through electrode 302 and, based on that change, can determine the magnitude of the capacitance at electrode 302.

In the case of capacitive touch sensors, the presence of conductive material in proximity to, but not in contact with, the sensor may be sufficient to trigger the controller to detect a touch event. Accordingly, there may be some risk of false positives, in which a touch is detected, but the user has not in fact made physical contact with the touch sensor. To minimize the likelihood of false positives touch controller 306 may be configured to execute filtering algorithms configured to reduce the likelihood of false positives.

Figure 4A:
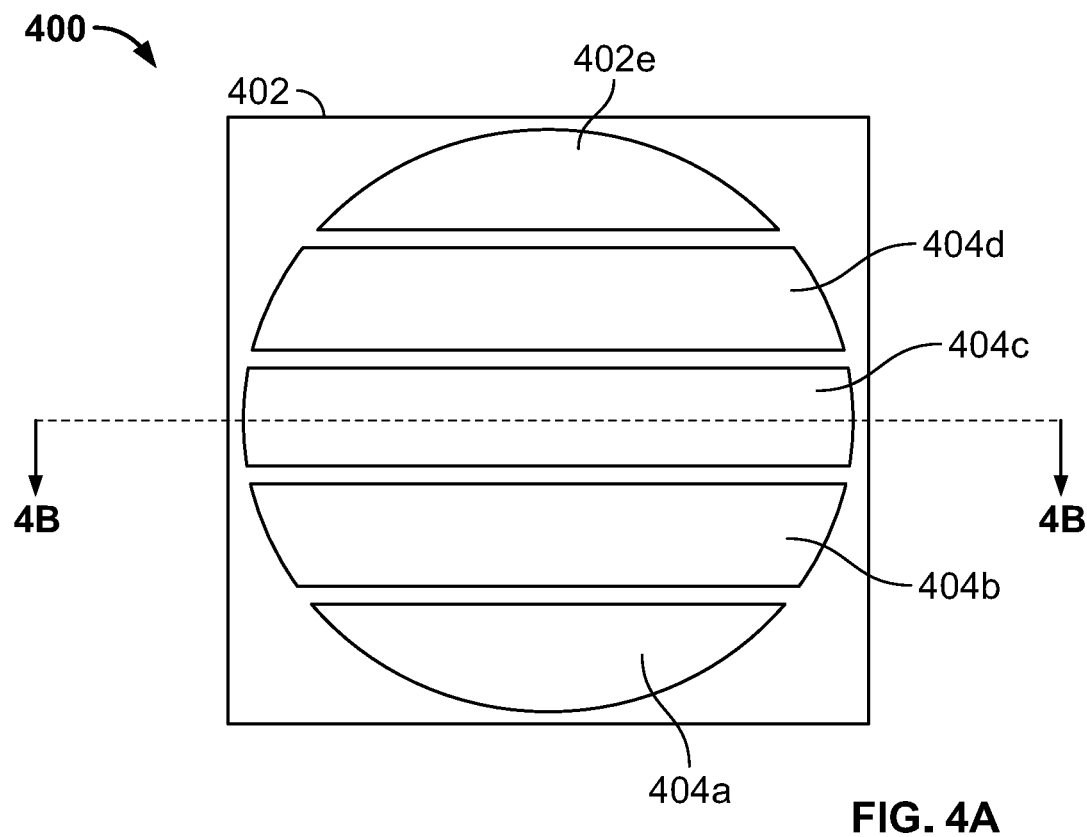
FIGS. 4A-4C are illustrations of a touch control interface and related system in which a touch control electrode of the touch control interface can operate as an antenna of a wireless communication system.
Figure 4B:
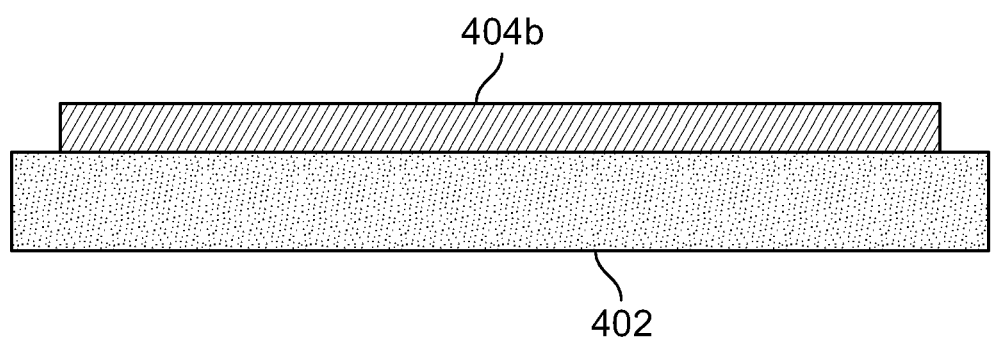

FIGS. 4A and 4B depict a touch control interface 400 for use in electronic device 104. FIG. 4A shows a top view of touch control interface 400, while FIG. 4B shows a cross-sectional view of touch control interface 400 taken along line 4B-4B of FIG. 4A. Touch control interface 400 may be incorporated into a housing or exterior of electronic device 104 enabling a user of electronic device 104 to touch and interact with touch control interface 400 as described herein. In a typical application, touch control interface 400 may have a width and length of approximately 10 millimeters, for example.

Touch control interface 400 is formed over a substrate 402, which includes a material over which conductive structures can be deposited or mounted. Substrate 402 may include relatively stiff materials, such as a printed circuit board (PCB) (e.g., a glass-reinforced epoxy laminate material), or more flexible materials, such as flexible PCB (e.g., polyimide, Polyether ether ketone, or transparent conductive polyester film).

A number of touch control electrodes 404a-404e are formed over a surface of substrate 402. In the example depicted in FIG. 4A five electrodes 404 are shown, though in other implementations touch control interface 400 may have a different number of electrodes 404, as required or preferred given a particular application for touch control interface 400. Touch control electrodes 404a-404e include a conductive material (e.g., copper or aluminum) that is attached or adhered to substrate 402 through a lamination or other suitable deposition process. Touch control electrodes 404a-404e are electrically isolated from one another. As such, in the depicted embodiment, there is some physically separation or isolation of the various touch control electrodes 404a-404e.

Although not depicted in FIGS. 4A and 4B, in some embodiments, an insulating or protective layer may be formed over touch control electrodes 404a-404e. The insulating layer may be a layer of encapsulant formed over touch control electrodes 404a-404e after electrodes 404a-404e are laminated to substrate 402. Such encapsulant is non-conductive and may include silicone-based materials, polymers, or insulating resins, for example. In some embodiments, a surface of touch control electrodes 404a-404e may be treated so as to provide environmental protection to touch control electrodes 404a-404e.

Figure 4C:
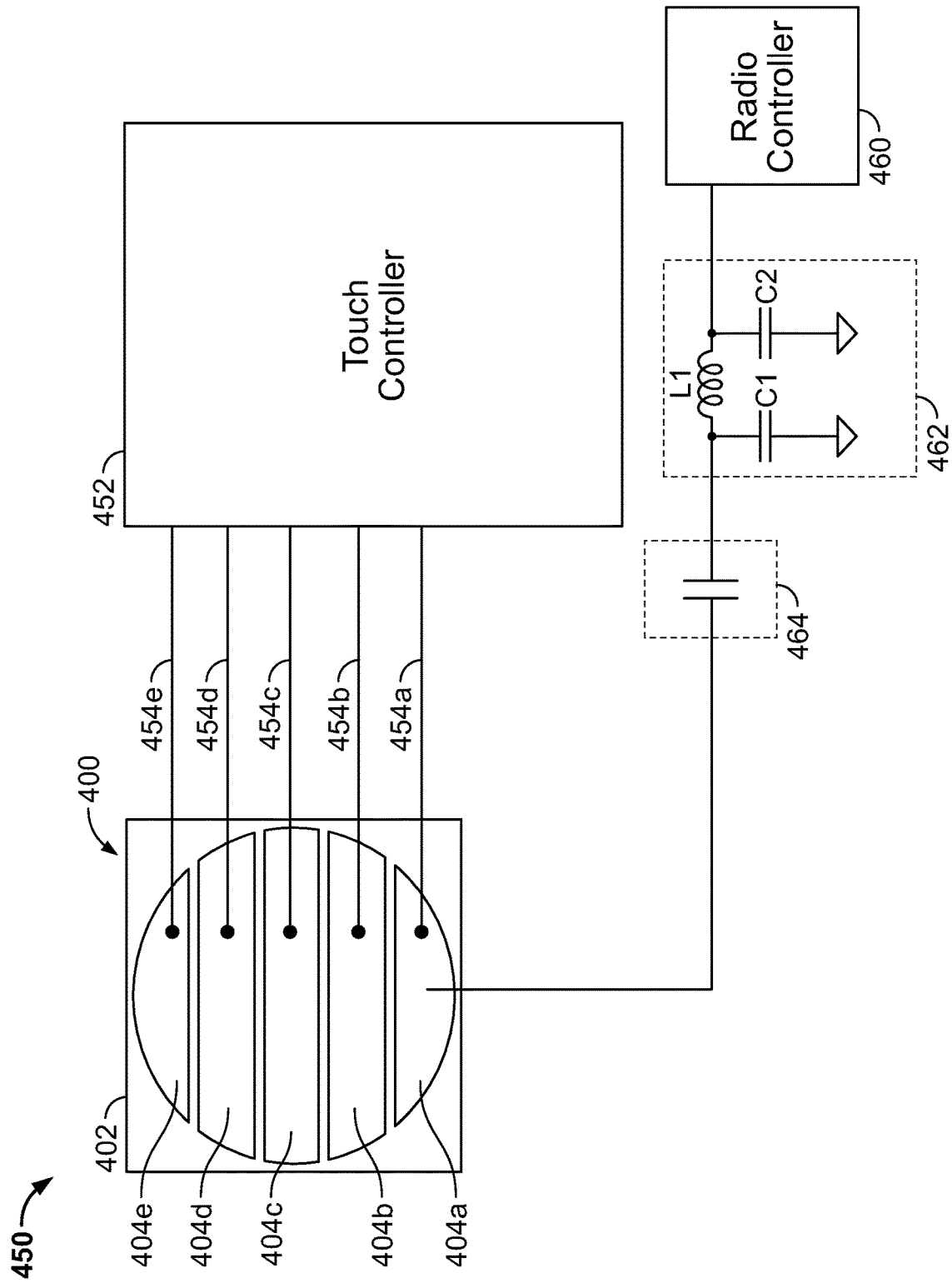

FIG. 4C is a system block diagram depicting a system 450 including an embodiment of touch control interface 400 in which one of touch control electrodes 404a-404e is utilized as an antenna of a wireless communication system.

System 450 includes touch controller 452. Touch controller 452 is configured to detect an object (e.g., a user's finger) touching or in close proximity to one or more of touch control electrodes 404a-404e. The functionality of touch controller 452 may be implemented by a stand-alone processor (e.g., a microprocessor, integrated circuit (IC), or application-specific integrated circuit (ASIC)). But in some embodiments, the functionality of touch controller 452 may be implemented by another processor, such as a central processor (e.g., processor 202) of device 104.

As illustrated, touch controller 452 is electrically connected by bus lines 454a-454e to each of touch control electrodes 404a-404e. Using bus lines 454a-454e touch controller 452 measures capacitances of each of touch control electrodes 404a-404e. As described above with respect to FIG. 3, there are many approaches by which touch controller 452 may measure the capacitance of a particular touch control electrode. In one implementation, touch controller 452 sequentially injects an oscillating signal (e.g., a signal having a frequency in a range of 1 KHz to 10 MHz, or greater) into touch control electrodes 404a-404e. By measuring the frequency of the signal reflected from the touch control electrodes, touch controller 452 can determine the capacitance of a specific touch control electrode. If the determined capacitance is nominal (i.e., the capacitance is equal to only the parasitic capacitance of the electrode or no change in capacitance is observed), touch controller 452 can determine that no object is in contact or close proximity to the touch control electrode. But when an object having a dielectric property that differs from the surrounding air (e.g., a user's finger) is brought into contact with or close proximity to the touch control electrode, an additional capacitance (see capacitance $C_T$ in FIG. 3) is established. This additional capacitance modifies the frequency of the signal reflected from the touch control electrode. Upon detecting the frequency shift, touch controller 452 determines that the touch control electrode has experienced a touch event (e.g., a user's finger or other object has touched the electrode or the protective layer over the electrode). Touch controller 452 may then notify the central processor of device 104 of the touch event on the specific touch control electrode and the central processor can then perform an appropriate action.

For example, with reference to FIGS. 4A-4C, touch control interface 400 may be utilized as a volume control for device 104. If the user sweeps a finger upwards along the touch control electrodes 404a-404e of touch control interface 400, device 104 will increase its output volume. Conversely, if the user sweeps a finger downwards along the touch control electrodes 404a-404e of touch control interface 400, device 104 will decrease its output volume.

A finger sweep along the surface of touch control interface 400 may be detected when the touch controller 452 determines that the touch control electrodes 404a-404e have experienced touch events in sequence. Touch controller 452 may sample the capacitance values of touch control electrodes 404a-404e at a relatively high frequency (e.g., a frequency ranging from around 60 Hz up to 200 Hz or greater). As such sample rates, touch controller 452 can detect a user sweeping a finger along touch control interface 400, even at a relatively high speed.

If controller 452 detects that the user has sequentially touched touch control electrodes 404a-404e, in that order (i.e., an upwards sweep with reference to the orientation of touch control interface 400 in FIG. 4A), the central processor (or, in some cases, touch controller 452) may determine that the user has swept a finger upward along touch control interface 400 indicating that the device 104 output volume is to be increased. Conversely, if controller 452 detects that the user has sequentially touched touch control electrodes 404e-404a, in that order (i.e., a downwards sweep with reference to the orientation of touch control interface 400 in FIG. 4A), the central processor (or, in some cases, touch controller 452) may determine that the user has swept a finger downward along touch control interface 400 indicating that the device 104 output volume is to be decreased.

System 450 includes a wireless communication system for wireless transmitting data to and receiving data from remote computer systems. The wireless communication system includes radio controller 460. Radio controller 460 is configured to receive data to be transmitted from processor 202 and convert that data into a suitable format for broadcast via one or more antennas (e.g., in the form of a radio frequency (RF) signal). Accordingly, radio controller 460 operates at the physical hardware level to control the transmission and reception of wireless communication signals.

Typically, data received from processor 202 is encoded as binary data. Radio controller 460, upon receipt of that data is configured to convert the binary data into an encoded analog RF signal suitable for transmission for broadcast wirelessly. Conversely, as encoded RF signals are received by the one or more antennas, those analog signals are received by radio controller 460. Radio controller 460 decodes the analog signals and converts them into binary-encoded data that can, in turn, be provided to processor 202. Upon receipt of the binary-encoded data, processor 202 can process the received data and take appropriate action.

Radio controller 460 may implement a number of different wireless communication protocols. In this example, radio controller 460 is configured to implement wireless communications using two different communications protocols—WIFI and BLUETOOTH. Both protocols require that data being transmitted or received using the protocol be encoded differently. Typically, data received by radio controller 460 from processor 202 will indicate which protocol should be utilized when processing the data to be transmitted wirelessly. Similarly, transmissions received by radio controller 460 by the one or more antennas will be encoded so as to identify the protocol used to encode each transmission.

Radio controller 460 is connected to touch control electrode 404a. In this configuration touch control electrode 404a, which includes a conductive material over substrate 402, operates as the antenna for radio controller 460, enabling radio controller 460 to transmit and receive wireless transmissions. In the geometrical configuration of touch control electrode 404a, touch control electrode 404a, being formed over substrate 402, may operate as a patch antenna for radio controller 460, enabling radio controller 460 to broadcast and receive wireless signal communications.

Impedance matching network 462 is connected between radio controller 460 and touch control electrode 404a. Impedance matching network 462 is configured to match an input impedance of touch control electrode 404a to an output impedance of radio controller 460. As depicted in FIG. 4C, impedance matching network 462 includes an inductor-capacitor (LC) network configured to provide impedance matching, though any suitable impedance matching network or impedance matching transmission line structure may be utilized.

In some cases, the signals injected into touch control electrode 404a by touch controller 452 to detect changes in the capacitance of touch control electrode 404a may themselves cause interference with the operation of radio controller 460. Either the injected signals themselves, or harmonics of those injected signals, for example, could interfere with a wireless communication received by touch control electrode 404a when acting as an antenna. To mitigate this potential interference, high-pass filter 464 may be coupled between touch control electrode 404a and radio controller 460.

High-pass filter 464 is generally configured to reduce a magnitude of a component of a signal passing through high-pass filter 464 (i.e., received through touch control electrode 404a or from radio controller 460) that corresponds to the signals transmitted by touch controller 452 as part of its touch detection processing, while not filtering signals having frequencies used for wireless communications. For example, high-pass filter 464 may be configured to reduce a magnitude of a component of the signal having a frequency less than 600 MHz (though in various embodiments high-pass filter 464 may have higher cutoff frequencies such as 800 MHz or 1 GHz). As most wireless communication protocols use signals having frequencies higher than 600 MHz, with high-pass filter 464 configured to filter out signals having frequencies less than 600 MHz, high-pass filter 464 does not interfere with the operation of radio controller 460. In some embodiments, high-pass filter 464 may be implement as a blocking capacitor (i.e., a capacitor configured to absorb signals having a frequency falling below the cut off frequency of high-pass filter 464). In such an implementation the capacitor may have a capacitance on the order of picofarads and be configured to block both oscillating signals having a frequency falling below the cut off frequency as well as direct current (DC) signals.

Conversely, in some applications, the wireless communication signals transmitted and received by radio controller 460 through touch control electrode 404a may interfere with the operation of touch controller 452 and the signals that touch controller 452 transmits into touch control electrode 404a to detect capacitance changes. Accordingly, an optional low-pass filter (not shown) may be incorporated into bus line 454a between touch controller 452 and touch control electrode 404a. Such low-pass filter is generally configured to reduce a magnitude of a component of a signal passing through the low-pass filter 464 that correspond to wireless communication signals. For example, the low-pass filter may be configured to reduce a magnitude of a component of the signal having a frequency greater than 100 MHz as touch controller 452 utilizes signal having a frequency less than 100 MHz, the low-pass filter would not modify or otherwise filter the signals used by touch controller 452 for touch detection in touch control electrode 404a. As such, the low-pass filter may be configured to filter out communication signals encoded according to an 802.11 communication protocol from signals passing through the low-pass filter.

Figure 5A:
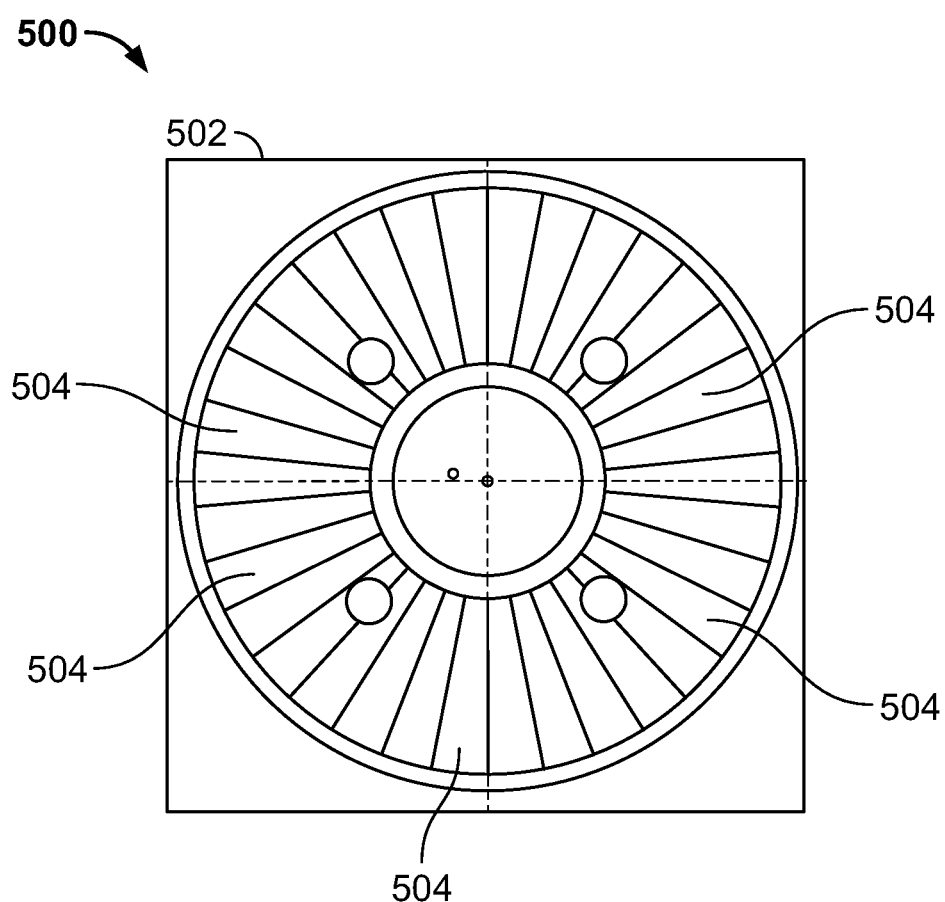
FIGS. 5A-5D are illustrations of a touch control interface and related system in which multiple touch control electrodes of the touch control interface can operate as an antenna of a wireless communication system.
Figure 5B:
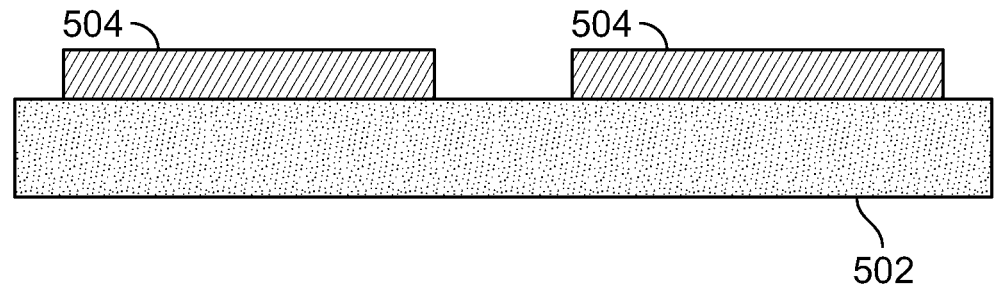

FIGS. 5A and 5B depict a touch control interface 500 for use in electronic device 104. FIG. 5A shows a top view of touch control interface 500, while FIG. 5B shows a cross-sectional view of touch control interface 500 taken along line 5B-5B of FIG. 5A. Touch control interface 500 may be incorporated into a housing or exterior of electronic device 104 enabling a user of electronic device 104 to touch and interact with touch control interface 500 as described herein.

Touch control interface 500 is formed over a substrate 502. Substrate 502 may include relatively stiff materials, such as a PCB (e.g., a glass-reinforced epoxy laminate material), or more flexible materials, such as flexible PCB (e.g., polyimide, Polyether ether ketone, or transparent conductive polyester film).

A number of touch control electrodes (i.e., touch control surfaces) 504 (including touch control electrodes 504a, 504b, 504c, and 504d) are formed over a surface of substrate 502. In the example depicted in FIG. 5A, 34 electrodes 504 are shown, though in other implementations, touch control interface 500 may have a different number of electrodes 504, as required or preferred given a particular application for touch control interface 500. Touch control electrodes 504 may all have the same shape or the shape of different touch control electrodes 504 in touch control interface 500 may vary. Typically, touch control electrodes 504 include a conductive material (e.g., copper or aluminum) that is attached or adhered to substrate 502 through a lamination or other suitable deposition process. In other embodiments, however, touch control electrodes 504 may be formed over or otherwise attached to substrate 502 using any suitable process or mechanism. Touch control electrodes 504 are electrically isolated from one another. As such, in the depicted embodiment, there is some physical separation or isolation of the various touch control electrodes 504.

Although not depicted in FIGS. 5A and 5B, in some embodiments, an insulating or protective layer may be formed over touch control electrodes 504. The insulating layer may be a layer of encapsulant formed over touch control electrodes 504 after electrodes 504 are laminated to substrate 502. Alternatively, a surface of touch control electrodes 504 may be treated so as to provide environmental protection.

Figure 5C:
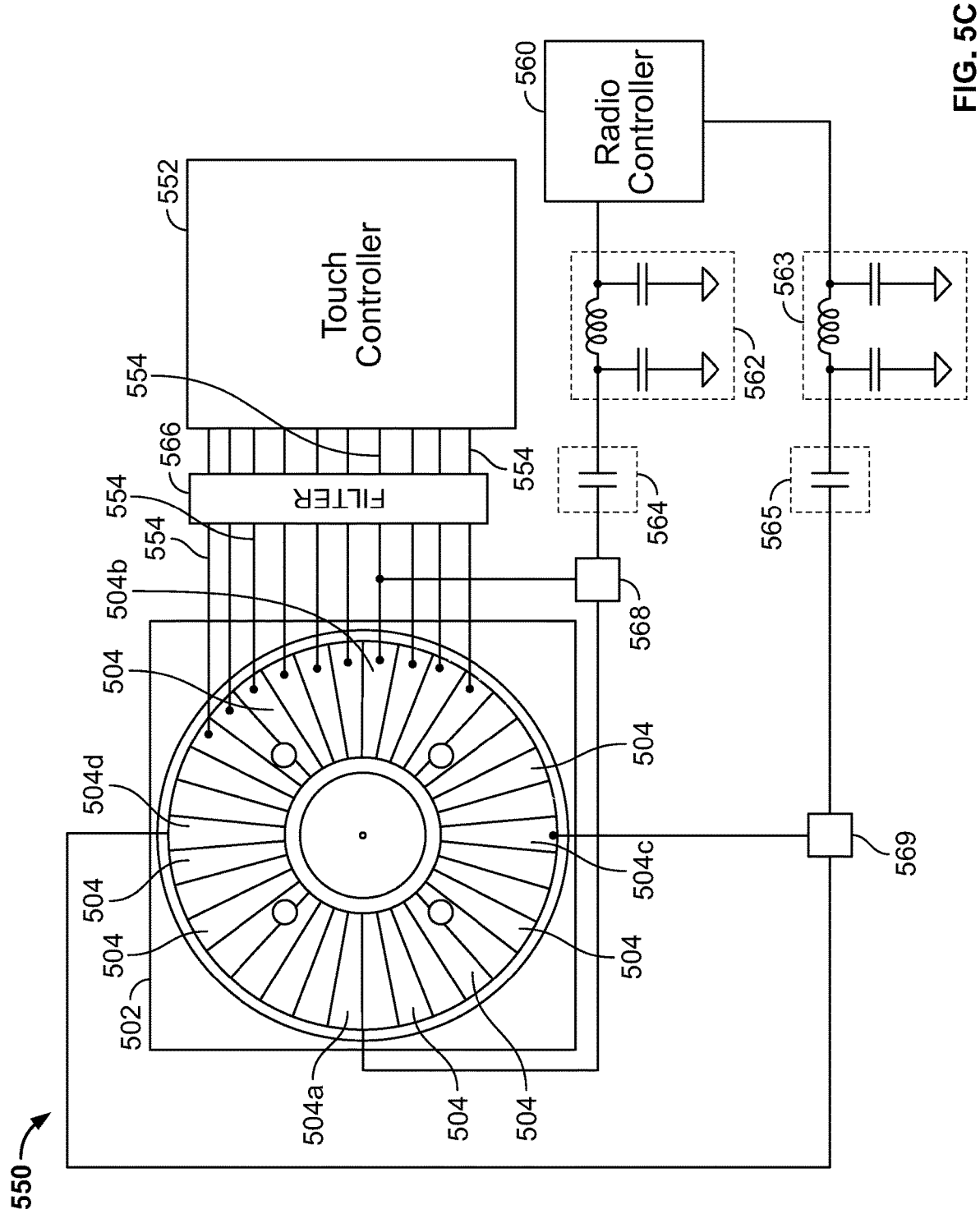

FIG. 5C is a system block diagram depicting a system 550 including an embodiment of touch control interface 500 in which four of touch control electrodes 504 may be utilized as antennas of a wireless communication system.

System 550 includes touch controller 552. Touch controller 552 is configured to detect a touch input resulting from an object (e.g., a user's finger) touching one or more of touch control electrodes 504. The functionality of touch controller 552 may be implemented by a stand-alone processor or may be implemented by another processor, such as a central processor (e.g., processor 202) of device 104.

As illustrated, touch controller 552 is electrically connected by bus lines 554 through filter 566 (described in more detail below) to each of touch control electrodes 504 to form the touch control system. To simplify FIG. 5C, only a subset of the bus lines 554 are illustrated. In a typical implementation touch controller 552 would be connected by separate bus lines 554 to each touch control electrode 504 of interface 500. Using bus lines 554, touch controller 552 measures capacitances of each of touch control electrodes 504. As described above with respect to FIG. 3, there are many approaches by which touch controller 552 measures the capacitance of a particular touch control electrode 504. In one implementation, touch controller 552 sequentially injects an oscillating signal (e.g., having a frequency in a range of 1 KHz to 10 MHz, or greater) into each touch control electrode 504. By measuring the frequency of the signal reflected from the touch control electrode 504, touch controller 552 can determine the capacitance of the touch control electrode 504. If the determined capacitance is nominal (i.e., the capacitance is equal to only the parasitic capacitance of the electrode), touch controller 552 can determine that there is no touch input and that no object is in contact or close proximity to the touch control electrode 504. But, when an object having a dielectric property that differs from the surrounding air (e.g., a user's finger) is brought into contact with or close proximity to the touch control electrode, an additional capacitance (see capacitance $C_T$ in FIG. 3) is established. This additional capacitance modifies the frequency of the signal reflected from the touch control electrode by an amount differing from the nominal shift. The frequency shift is detected by touch controller 552, which determines that the touch control electrode has experienced a touch input (e.g., a user has touched the electrode or the protective layer over the electrode with his or her finger). Touch controller 552 may then notify the central processor of device 104 of the touch event on the specific touch control electrode 504 and the central processor or radio controller 560 can then perform an appropriate action.

Figure 5D:
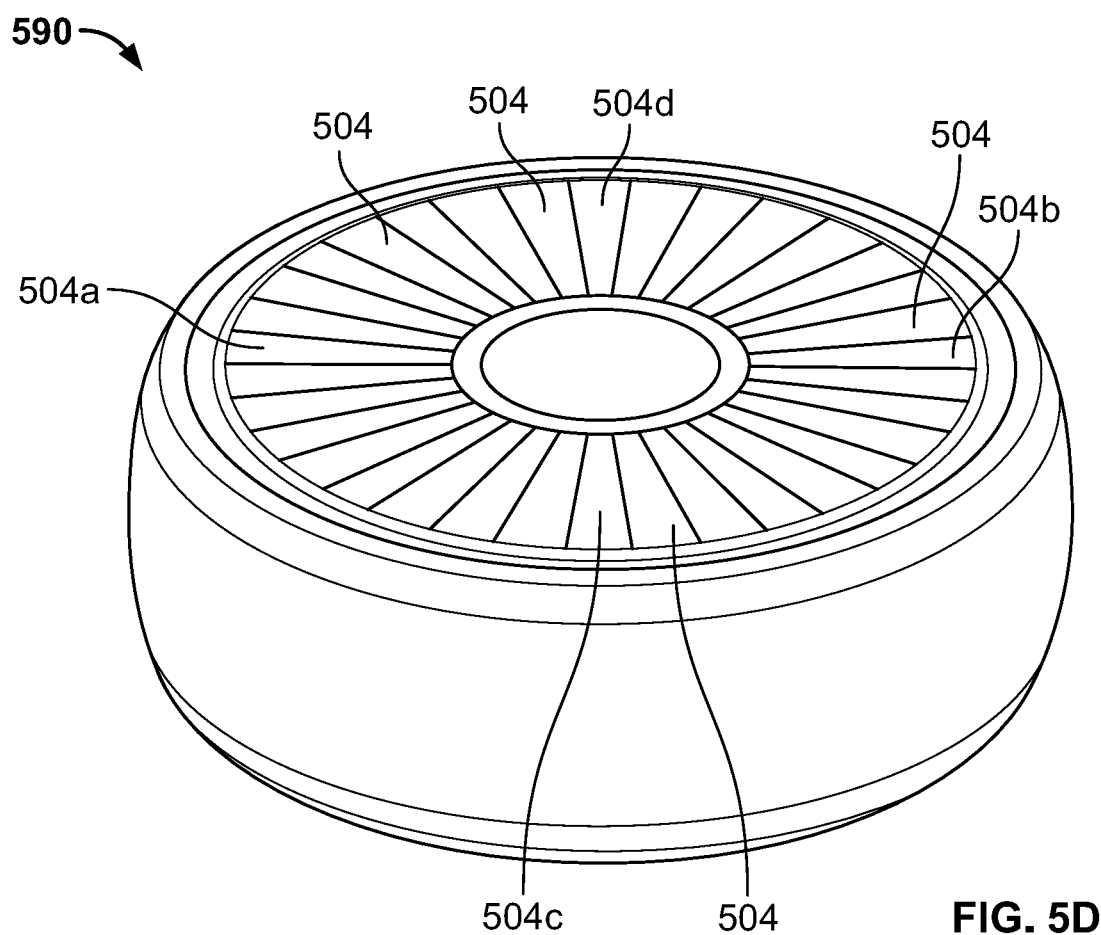

For example, with reference to FIGS. 5A-5D, touch control interface 500 may be utilized as an input device for a device, such as device 104 of FIG. 1. To illustrate, FIG. 5D is a perspective view of an example device 590 that may incorporate touch control interface 500. As shown, touch control interface 500 is positioned on a top surface of device 590. Other components of system 550 illustrated in FIG. 5C may be positioned within an interior volume of device 590. The incorporation of touch control interface 500 into the top surface of device 590 (as depicted in FIG. 5D) enables a user to touch the top surface of device 590 in various locations to provide inputs thereto to control the operation of device 590 (e.g., by adjusting an output volume or brightness of device 590, or selecting different output content for device 590). For example, if the touch controller 552 determines that the user has swept a finger along a sequence of touch control electrodes 504, device 104 can take an appropriate action (e.g., by increasing the output volume of device 104, changing a radio station to which device 104 is turned, or advancing an audio book). To detect an input, touch controller 552 may sample the capacitance values of touch control electrodes 504 at a relatively high frequency (e.g., a frequency ranging from around 60 Hz up to 200 Hz or greater). As such sample rates, touch controller 552 can detect a user sweeping a finger along a number of different touch control electrodes 504, even at a relatively high speed.

System 550 includes a wireless communication system for wirelessly transmitting data to and receiving data from remote computer systems. The wireless communication system includes radio controller 560. Radio controller 560 is configured to receive data to be transmitted from processor 202 and convert that data into a suitable format for broadcast via one or more antennas. Accordingly, radio controller 560 operates at the physical hardware level to control the transmission and reception of RF wireless communication signals.

Radio controller 560 is connected to touch control electrodes 504a, 504b, 504c, and 504d. In this configuration touch control electrodes 504a-504d, which each include a conductive material over substrate 502, can operate as antennas for radio controller 560, enabling radio controller 560 to transmit and receive wireless transmissions. In the geometrical configuration of touch control electrodes 504a-504d, touch control electrodes 504a-504d, being formed over substrate 502, may operate as patch antennas for radio controller 560, enabling radio controller 560 to broadcast and receive wireless signal communications.

Radio controller 560 includes two signal paths. The first signal path is electrically coupled to either touch control electrode 504a or 504b by switch 568. The state of switch 568 is controlled by radio controller 560. The first signal path includes an impedance matching network 562 and high-pass filter 564. The second signal path of radio controller 560 is electrically coupled to either touch control electrode 504c or 504d by switch 569. The state of switch 569 is controlled by radio controller 560. The second signal path includes an impedance matching network 563 and high-pass filter 565.

Impedance matching network 562 is connected between radio controller 560 and touch control electrodes 504a and 504b. Impedance matching network 562 is configured to match an input impedance of touch control electrodes 504a and 504b to an output impedance of radio controller 560. As depicted in FIG. 5C, impedance matching network 562 includes an LC network configured to provide impedance matching, though any suitable impedance matching network may be utilized. In a similar manner, impedance matching network 563 is configured to match an input impedance of touch control electrodes 504c and 504d to an output impedance of radio controller 560.

In some cases, the signals injected into touch control electrodes 504a and 504b by touch controller 552 to detect changes in the capacitance of touch control electrodes 504a and 504b may cause interference with the operation of radio controller 560. Either the injected signals, or harmonics of those injected signals, for example, could interfere with a wireless communication signal received by touch control electrode 504a when acting as an antenna. To mitigate this potential interference, high-pass filter 564 may be coupled between touch control electrodes 504a and 504b and radio controller 560.

High-pass filter 564 is generally configured to reduce a magnitude of a component of a signal passing through high-pass filter 564 (i.e., received through touch control electrode 504a or 504b or from radio controller 560) that corresponds to the signals transmitted by touch controller 552 as part of its touch detection processing, while not filtering signals having frequencies used for wireless communications. For example, high-pass filter 564 may be configured with a cutoff frequency selected to reduce a magnitude of a component of the signal having a frequency less than 600 MHz (though in various embodiments high-pass filter 564 may have higher cutoff frequencies such as 800 MHz or 1 GHz).

Similarly, the signals injected into touch control electrodes 504c and 504d by touch controller 552 to detect changes in the capacitance of touch control electrodes 504c and 504d may cause interference with the operation of radio controller 560. Accordingly, high-pass filter 565 is generally configured to reduce a magnitude of a component of a signal passing through high-pass filter 565 that corresponds to the signals transmitted by touch controller 552 as part of its touch detection processing, while not filtering signals having frequencies used for wireless communications. For example, high-pass filter 565 may have a cutoff frequency configured to reduce a magnitude of a component of the signal having a frequency less than 600 MHz (though in various embodiments high-pass filter 564 may have higher cutoff frequencies such as 800 MHz or 1 GHz).

In some applications, the wireless communication signals transmitted and received by radio controller 560 through touch control electrodes 504a-504d may interfere with the operation of touch controller 552 and the signals that touch controller 552 transmits into touch control electrodes 504a-504d to detect capacitance changes. Accordingly, an optional low-pass filter 566 may be incorporated into the bus lines 554 that extend between touch controller 552 and touch control electrodes 504a and 504b. Such low-pass filter is generally configured to reduce a magnitude of a component of a signal passing through the low-pass filter that corresponds to wireless communication signals. For example, the low-pass filter may be configured to reduce a magnitude of a component of the signal having a frequency greater than about 100 MHz, though in different implementations the cutoff frequency of the low-pass filter may be higher or lower. As such, low-pass filter 566 may be configured to filter out communication signals encoded according to an 802.11 communication protocol from signals passing through low-pass filter 566.

Having two signal paths, radio controller 560 is configured to implement a 2×2 communication scheme wherein the radio controller 560 uses two separate antennas to concurrently transmit and receive different wireless communication transmissions. The first antenna may be used to transmit a first wireless communication signal, while, at the same time, the second antenna may be used to transmit a second wireless communication signal that is different from the first signal. This can enable more throughput of radio controller 560 than a configuration that only uses a single path that only enables a single wireless communication transmission to be transmitted or received at a time.

During communication, radio controller 560, using switch 568, selects one of touch control electrodes 504a and 504b to operate as the first antenna of the 2×2 communication scheme. Similarly, using switch 569, radio controller 560 selects one of touch control electrodes 504c and 504d to operate as the second antenna of the 2×2 communication scheme.

In some cases, by selecting one touch control electrode 504 over another (e.g., touch control electrode 504a versus 504b) radio controller 560 may provide improved wireless communication performance. If, for example, a user is touching touch control electrode 504a, the performance of touch control electrode 504a as an antenna may be diminished or degraded due to the presence of the relatively high dielectric object (i.e., the finger) nearby or in contact with the antenna. In such a case, radio controller 560 may cease using touch control electrode 504a as an antenna and may instead utilize touch control electrodes 504b as the first antenna of the 2×2 communication scheme as that touch control electrode is not currently being touched and may perform as a better antenna for the transmission and reception of wireless communication signals.

To assist radio controller 560 in selecting touch control electrodes 504a-504d to utilize as antennas for wireless communications, touch controller 552 is configured to, upon detecting a touch input for any of touch control electrodes 504a-504d, transmit a message to radio controller 560 informing radio controller 560 of such a touch input. The notification includes an identification of which touch control electrode 504 received the touch input. Upon receiving a notification that one of touch control electrodes 504a-504d is being touched, radio controller 560 may be configured to utilize a non-touched touch control electrode as an antenna.

To select an touch control electrodes for use antennas in implementing a 2×2 communication scheme, based upon the identification of electrodes currently being touch received from touch controller 552, radio controller 560 may utilize a logic table, such as that depicted in Table 1, below.

TABLE 1

| Electrodes Being Touched | Electrode to Use As Antenna |
|---|---|
| 504a | 504b |
| 504b | 504a |
| 504a and 504b | Continue using current antenna |
| None | Continue using current antenna |
| 504c | 504d |
| 504d | 504c |
| 504c and 504d | Continue using current antenna |
| None | Continue using current antenna |

As depicted in Table 1, if touch controller 552 reports to radio controller 560 that a touch input was detected for touch control electrode 504a, radio controller 560 will actuate switch 568 to electrically connect the first signal path of radio controller 560 to touch control electrode 504b to use touch control electrode 504b as the first antenna of the 2×2 communication scheme. Conversely, if touch controller 552 reports to radio controller 560 that a touch input was detected for touch control electrode 504b, radio controller 560 will actuate switch 568 to electrically connect the first signal path of radio controller 560 to touch control electrode 504a to use touch control electrode 504a as the first antenna. If, however, touch controller 552 reports a touch input at both or neither of touch control electrodes 504a and 504b, radio controller 560 may be configured to continue using the current antenna, making no change to its configuration. Similarly, if touch controller 552 reports to radio controller 560 that a touch input was detected for touch control electrode 504c, radio controller 560 will actuate switch 569 to electrically connect the second signal path of radio controller 560 to touch control electrode 504d to use touch control electrode 504d as the second antenna of the 2×2 communication scheme. Conversely, if touch controller 552 reports to radio controller 560 that a touch input was detected for touch control electrode 504d, radio controller 560 will actuate switch 569 to electrically connect the second signal path of radio controller 560 to touch control electrode 504c to use touch control electrode 504c as the second antenna. If, however, touch controller 552 reports a touch input at both or neither of touch control electrodes 504c and 504d, radio controller 560 may be configured to continue using the current antenna, making no change to its configuration.

In other embodiments of system 550, radio controller 560 may be configured to use three or more of touch control electrodes 504 as antennas. The various touch control electrodes 504 may be used as antennas at the same time, such as when implementing, for example, a 3×3 communication scheme enabling concurrent use of three different antennas to transmit and receive different wireless communication transmissions. Alternatively, radio controller 560 may be configured (e.g., using switch 568) to selectively electrically connect to a subset of a group of touch control electrodes 504 to utilize a specific touch control electrode 504 or group of touch control electrodes 504 as an antenna.

As mentioned above, it is possible for touch controller 552 to inaccurately detect a touch input at a particular touch control electrode 504. Even though a user may not be touching a particular touch control electrode 504, objects in proximity to the electrode 504, or other electromagnetic variations in the environment of system 550 or within system 550 may cause a capacitance of a touch control electrode 504 to fluctuate, resulting in touch controller 552 inaccurately detecting a touch input. To reduce the likelihood of an inaccurate touch input detection, touch controller 552 may be configured to use signal power data generated by radio controller 560 to identify instances of inaccurately detected false positive touch inputs.

Specifically, if a user is touching a touch control electrode 504 that radio controller 560 is also utilizing as an antenna for wireless signal communications, the user's finger (which has a higher dielectric constant than the surrounding air) will degrade the efficiency of that touch control electrode 504. Accordingly, radio controller 560 will detect a higher signal power (e.g., measured as a received signal strength indicator (RSSI)) of a received wireless transmission before the user touches the touch control electrode 504, than when the user is touching the touch control electrode 504.

Accordingly, if touch controller 552 detects a touch input at a touch control electrode 504 that is also being used as an antenna, but, at the same time, the radio controller 560 does not detect a reduction in RSSI for wireless signals received via that touch control electrode 504, that may indicate that the detect touch input has been erroneously detected and that a user's finger or other object is not contacting or in close proximity to the touch control electrode 504.

Radio controller 560 may therefore be configured to periodically measure RSSI values for signals received via the touch control electrodes 504 radio controller 560 is using as antenna and report those values to touch controller 552. As such, touch controller 552 periodically (e.g., ever 10 milliseconds, every 500 milliseconds, or every second) receives RSSI measurements for particular touch control electrodes 504.

Upon detecting a potential touch input at one of the touch control electrodes 504 being utilized by radio controller 560 as an antenna (i.e., the measured capacitance of the touch control electrode 504 changes by an amount exceeding a minimum capacitance change threshold for touch detection), touch controller 552 may use the RSSI values received from radio controller 560 to confirm that a touch input has been accurately detected. Specifically, touch controller 552 is configured to compare a first RSSI that was received from radio controller 560 before the potential touch input was detected to a second RSSI that was received from radio controller 560 after the potential touch input was detected. If the two RSSI values are the same or within a threshold difference (e.g., within 3%, 5%, or 10% of one another), that indicates that the touch input was inaccurately detected and the detected touch input event can be ignored. But if the two RSSI values differ by greater than the threshold amount, that can indicate that an object (e.g., a finger) with a higher dielectric constant than air is now in contact with the touch control electrode 504 and the touch controller 552 can report the touch input to the radio controller 560. The radio controller 560 may then use the touch input identification received from touch controller 552 to select a different touch control electrode 504 to utilize as an antenna. In this manner the signal strength (e.g., RSSI) reports provided by radio controller 560 can be used by touch controller 552 to help identify touch inputs that were inaccurately detected.

The touch control interfaces of FIGS. 4A and 5A generally operate by detecting an object contacting or being brought into close proximity to a single touch control electrode. In some cases, however, a touch control interface may be implemented with overlapping touch control electrodes enabling detection of the object by multiple touch control electrodes that can, in turn, provide a more accurate identification of the location of the touching object.

Figure 6A:
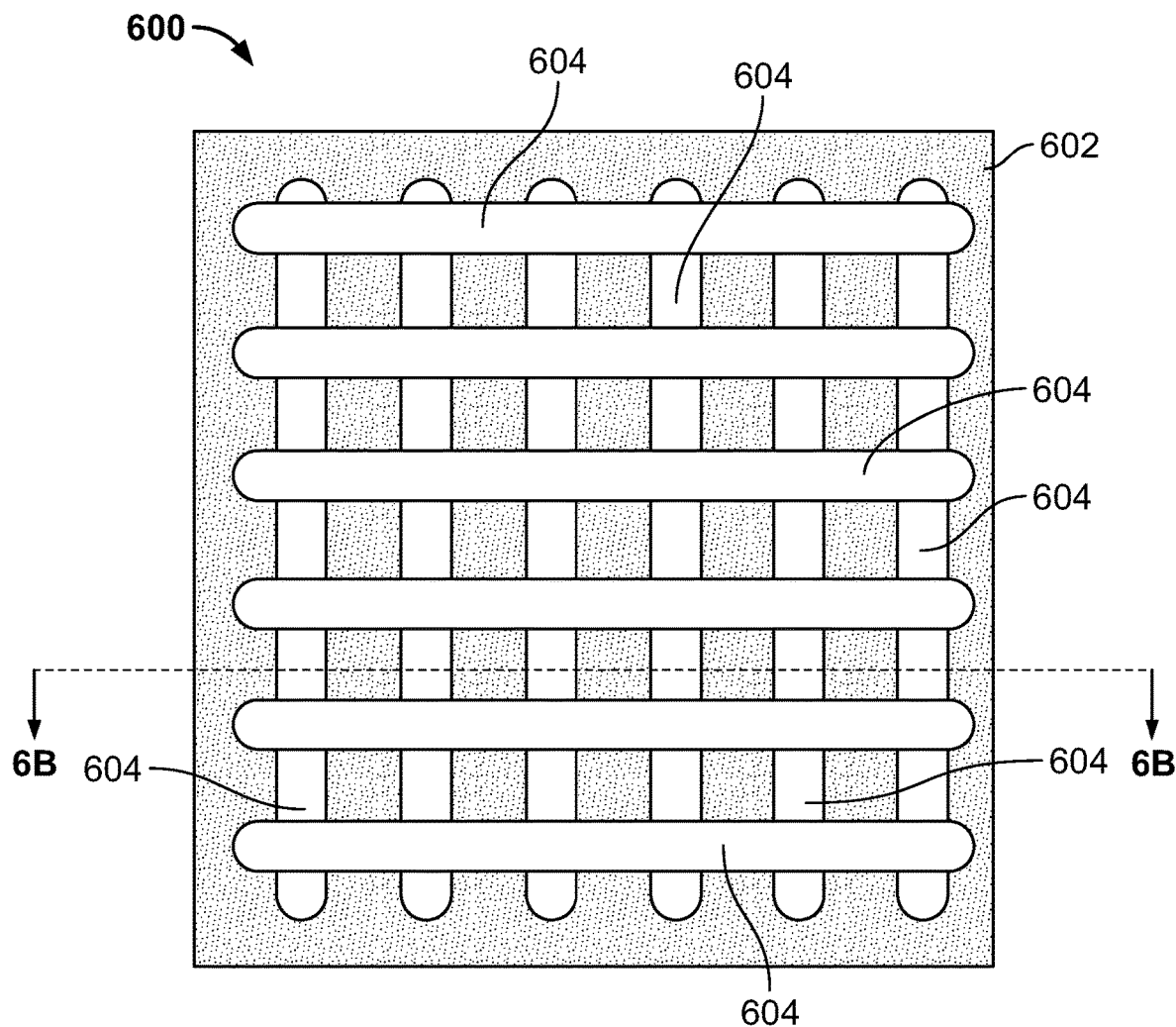
Figure 6B:
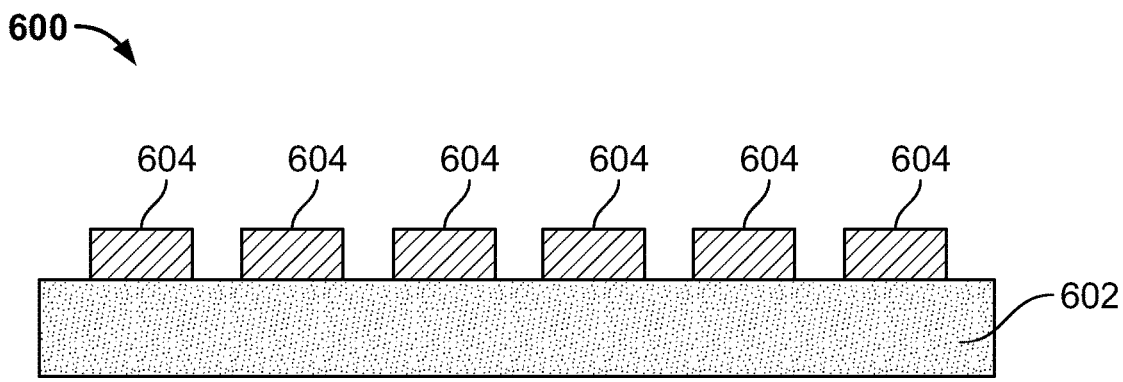

FIGS. 6A and 6B depict a touch control interface 600 for use in electronic device 104. FIG. 6A shows a top view of touch control interface 600, while FIG. 6B shows a cross-sectional view of touch control interface 600 taken along line 6B-6B of FIG. 6A. Touch control interface 600 may be incorporated into a housing or exterior of electronic device 104 enabling a user of electronic device 104 to touch and interact with touch control interface 600 as described herein.

Touch control interface 600 is formed over a substrate 602, which includes a material over which conductive structures can be deposited or mounted. Substrate 602 may include relatively stiff materials, such as a PCB (e.g., a glass-reinforced epoxy laminate material), or more flexible materials, such as flexible PCB (e.g., polyimide, Polyether ether ketone, or transparent conductive polyester film).

A number of touch control electrodes (i.e., touch control surfaces) 604 (including touch control electrodes 604a-604i) are formed over a surface of substrate 602. In the example depicted in FIG. 6A 12 electrodes 604 are shown, though in other implementations, touch control interface 600 may have a different number of electrodes 604, as required or preferred given a particular application for touch control interface 600. Typically, touch control electrodes 604 include a conductive material that is positioned over substrate 602. Although touch control electrodes 604 may include non-transparent conductive materials (e.g., copper or aluminum), if touch control interface 600 is to be incorporated into a display screen of device 104, touch control electrodes 604 (and substrate 602) may be fabricated from transparent materials, enabling touch control interface 600 to be positioned over the display screen. Specifically, touch control electrodes 604 may include transparent and conductive materials, such as indium tin oxide (ITO) of collections of silver nanowires that are formed as a mesh in the shape of the touch control electrodes 604. In some arrangements, silver nanowires or other conductive meshes may operate as relatively efficient antenna structures due to the material's relatively low sheet resistance of around 10-30 Ohms per square centimeter. When using transparent materials, substrate 602 may include transparent materials such as transparent plastic films (e.g., polyethylene terephthalate (PET) or cyclo-olefin polymer (COP)).

Touch control electrodes 604 are electrically isolated from one another. As such, in the depicted embodiment, there is some physical separation or isolation of the various touch control electrodes 604. With reference to FIG. 6A, touch control electrodes 604 may be deposited over substrate 602 in a number of distinct steps. In a first deposition process, the vertically oriented control electrodes 604 are positioned over substrate 602. To provide adequate electrical isolation between the horizontal and vertical control electrodes 604, a transparent insulating layer (not shown) may be deposited over the vertically-oriented touch control electrodes 604. After the vertically-oriented touch control electrodes 604 are positioned over substrate 602, the horizontally-oriented touch control electrodes 604 are positioned over substrate 602 on the insulating layer separating the horizontally-oriented touch control electrodes 604 from the vertically-oriented touch control electrodes 604. Although not depicted in FIGS. 6A and 6B, in some embodiments, an insulating or protective layer may be formed over touch control electrodes 604.

FIG. 6C is a system block diagram depicting a system 650 including an embodiment of touch control interface 600 in which multiple touch control electrodes 604 may be utilized as an antenna of a wireless communication system.

System 650 includes touch controller 652. Touch controller 652 is configured to detect an object (e.g., a user's finger) touching or in close proximity to one or more of touch control electrodes 604. As illustrated, touch controller 652 is electrically connected by bus lines 654 to each of touch control electrodes 604 to form the touch control system. Using bus lines 654 touch controller 652 sequentially measures capacitances of each of touch control electrodes 604. As described above with respect to FIG. 3, there are many approaches by which touch controller 652 measures the capacitance of a particular touch control electrode 604. In one implementation, touch controller 652 sequentially injects an oscillating signal (e.g., having a frequency in a range of 1 KHz to 10 MHz) into each touch control electrode 604. By measuring the frequency of the signal reflected from the touch control electrode 604, touch controller 652 can determine the capacitance of the touch control electrode 604. If the determined capacitance is nominal (i.e., the capacitance is equal to only the parasitic capacitance of the electrode 604), touch controller 652 can determine that no object is in contact with or close proximity to the touch control electrode 604. But when an object having a dielectric property that differs from the surrounding air (e.g., a user's finger) is brought into contact with or close proximity to the touch control electrode 604, an additional capacitance (see capacitance $C_T$ in FIG. 3) is established. This additional capacitance modifies the frequency of the signal reflected from the touch control electrode 604. The frequency shift is detected by touch controller 652, which determines that the touch control electrode has experienced a touch input (e.g., a user has touched the electrode or the protective layer over the electrode with his or her finger). Touch controller 652 may then notify the central processor of device 104 or radio controller 660 of the touch event on the specific touch control electrode 604 and the central processor or radio controller 660 can then perform an appropriate action.

System 650 includes a wireless communication system for wirelessly transmitting data to and receiving data from remote computer systems. The wireless communication system includes radio controller 660. Radio controller 660 is configured to receive data to be transmitted from processor 202 and convert that data into a suitable format for broadcast via one or more antennas. Accordingly, radio controller 660 operates at the physical hardware level to control the transmission and reception of wireless communication signals.

Radio controller 660 is connected to touch control electrodes 604a-604i. In this configuration touch control electrodes 604a-604i can each operate as an antenna for radio controller 660, enabling radio controller 660 to transmit and receive wireless transmissions. In the geometrical configuration of touch control electrodes 604a-604i, touch control electrodes 604a-604i, being formed over substrate 602, may operate as a patch antennas for radio controller 660, enabling radio controller 660 to broadcast and receive wireless signal communications.

Radio controller 660 includes three signal paths. The first signal path can be electrically coupled to either touch control electrode 604a, 604b, or 604c by switch 668a. The state of switch 668a is controlled by radio controller 660. The first signal path includes an impedance matching network 662a and high-pass filter 664a. The second signal path can be electrically coupled to either touch control electrode 604d, 604e, or 604f by switch 668b. The state of switch 668b is controlled by radio controller 660. The second signal path includes an impedance matching network 662b and high-pass filter 664b. The third signal path can be electrically coupled to either touch control electrode 604g, 604h, or 604i by switch 668c. The state of switch 668c is controlled by radio controller 660. The third signal path includes an impedance matching network 662c and high-pass filter 664c.

Impedance matching networks 662a-662c are connected between radio controller 660 and touch control electrodes 604a-604c, 604d-604f, and 604g-604i, respectively. Impedance matching networks 662a-662c are configured to match an input impedance of their respective touch control electrodes 604 and the output impedance of the connected signal path of radio controller 660.

In some cases, the signals injected into touch control electrodes 604 by touch controller 652 to detect changes in the capacitance of touch control electrodes 604 may cause interference with the operation of radio controller 660. Either the injected signals themselves, or harmonics of those injected signals, for example, could interfere with a wireless communication received by touch control electrode 604a when acting as an antenna. To mitigate this potential interference, high-pass filters 664a, 664b, and 664c may be coupled between touch control electrodes 604 and radio controller 660 on each of the three signal paths of radio controller 660 as depicted in FIG. 6C.

High-pass filters 664a, 664b, and 664c are generally configured to reduce a magnitude of a component of a signal passing through high-pass filters 664a, 664b, and 664c (i.e., received through one of touch control electrodes 604 or from radio controller 660) that corresponds to the signals transmitted by touch controller 652 as part of its touch detection processing, while not filtering signals having frequencies used for wireless communications. For example, high-pass filters 664a, 664b, and 664c may have cutoff frequencies configured to reduce a magnitude of a component of the signal having a frequency less than 600 MHz (though in various embodiments high-pass filters 664a, 664b, and 664c may have higher cutoff frequencies such as 800 MHz or 1 GHz).

Conversely, in some applications, the wireless communication signals transmitted and received by radio controller 660 through touch control electrodes 604a-604i may interfere with the operation of touch controller 652 and the signals that touch controller 652 transmits into touch control electrodes 604 to detect capacitance changes. Accordingly, an optional low-pass filter (not shown) may be incorporated into the bus lines 654 that extend between touch controller 652 and touch control electrodes 604. Such low-pass filter is generally configured to reduce a magnitude of a component of a signal passing through the low-pass filter that correspond to wireless communication signals. For example, the low-pass filter may be configured to reduce a magnitude of a component of the signal having a frequency greater than about 100 MHz, though in different implementations the cutoff frequency of the low-pass filter may be higher or lower.

In some embodiments, radio controller 660 may be configured to use, at a particular time, only one touch control electrodes 604 as an antenna for each signal path of radio controller 660. Using switch 668a, for example, radio controller 660 can select one of touch control electrodes 604a, 604b, and 604c to which the first signal path of radio controller 660 is electrically connected. By selecting particular touch control electrodes 604 to use as antennas, radio controller 660 may provide improved wireless communication performance. If, for example, a user is touching touch control electrode 604d, the performance of touch control electrode 604d as an antenna may be diminished due to the presence of the relatively high dielectric object (i.e., the finger) nearby or in contact with the antenna. In such a case, radio controller 660 may instead utilize one of touch control electrodes 604e or 604f as those electrodes are not currently being touched and may perform as a better antenna for the transmission and reception of wireless communication signals.

Having three signal paths, radio controller 660 may be configured to implement a 3×3 communication scheme wherein the radio controller 660 uses three separate antennas to concurrently transmit and receive different wireless communication transmissions. This can enable more throughput of radio controller 660 than a configuration that uses a single path only enabling a single wireless communication transmission to be transmitted or received at a time.

Accordingly, for each of the three signal paths, radio controller 660 selects one touch control electrode 604 for use as either the first, second, or third antenna in the 3×3 communication scheme. To assist radio controller 660 in selecting which touch control electrodes 604 to utilize as antennas for wireless communications, touch controller 652 is configured to, upon detecting a touch input for any of touch control electrodes 604, transmit a message to radio controller 660 informing radio controller 660 of such an event. The notification may include an indication for which touch control electrodes 604 a touch input was detected as well as an indication of the location of the touch input on touch control interface 600. With reference to FIG. 6C, for example, touch control interface 600 is arranged in a grid for which locations may be referenced using a coordinate system. Touch inputs at the top left of touch control interface 600 (as displayed in FIG. 6C) will be detected by touch controller 652 at touch control electrode 604*a* (the top most horizontal touch control electrode 604) and touch control electrode 604*d* (the left most vertical touch control electrode 604) and may be assigned a location coordinate of 1,1. Similarly, touch inputs at the bottom right of touch control interface 600 (as displayed in FIG. 6C) will be detected by touch controller 652 at touch control electrode 604*c* (the bottom most horizontal touch control electrode 604) and touch control electrode 604*f* (the right most vertical touch control electrode 604) and may be assigned a location coordinate of 6,6.

To select an appropriate touch control electrodes 604 for use as antennas, based upon the location of a touch input received from touch controller 652, radio controller 660 may utilize a logic table that specifies, for different locations of touch points in touch control interface 600, specific touch electrodes 604 (or combinations of touch control electrodes 604) to be used as an antenna by radio controller 660. In general however, given a particular location of a touch input as received from touch controller 652, radio controller 660 operates switches 668*a*-668*c* to use touch control electrode 604 that are not located underneath the touch input location as antennas. This can help to minimize the interference that may occur due to the presence of the finger or other object creating the touch input.

For example, if radio controller 660 receives a notification from touch controller 652 that a touch input has been detected at location 1,1, radio controller 660 may determine that the touch input is over touch control electrodes 604*a* and 604*d*. Accordingly, radio controller 660 will operate switch 668*a* to select an alternative touch control electrode 604 for use as the antenna for the first signal path of radio controller 660. Specifically, radio controller 660 operates switch 668*a* to disconnect and cease using touch control electrode 604*a* as an antenna and to connect the first signal path to either touch control electrode 604*b* or 604*c*, neither of which are location underneath the touch input. The determination of which touch control electrode 604 to switch to may be determined by an internal logic table of radio controller 660. Similarly, radio controller 660 will operate switch 668*b* to select an alternative touch control electrode 604 for use as the antenna for the second signal path of radio controller 660. Specifically, radio controller 660 operates switch 668*b* to disconnect and cease using touch control electrode 604*d* as an antenna and to connect the second signal path to either touch control electrode 604*e* or 604*f*, neither of which are location underneath the touch input. The determination of which touch control electrode 604 to switch to may be determined by an internal logic table of radio controller 660.

In some embodiments, historical touch input data may be utilized to predict where a user is most likely to provide a touch input to touch control interface 600, enabling an optimal set of touch control electrodes 604 to be selected as antennas for radio controller 660 in anticipation of that anticipated touch input.

Given a particular state of a device incorporating system 650, the user may be more likely to touch particular areas or locations of touch control interface 600 than others. If touch control interface 600 is incorporated into a mobile device, for example, the user may hold the mobile device in a particular way that tends to cause the user to touch interface 600 in particular locations. Similarly, if the device is performing a particular function, certain regions of touch control interface 600 may be more likely to be touched than others. For example, a first region of touch control interface 600 may be associated with inputs relating to the device's volume, while a second region of touch control interface 600 may be associated with inputs relating to the device's display brightness. If the device is performing an audio playback function (e.g., playing music or an audio book), it may be much more likely that the user touch the first region (to control volume) than the second region. But if the device is performing a visual output functions (e.g., illuminating a desk lamp or displaying a text output), it may be much more likely that the user touch the second region (to control display brightness) than the first region.

Accordingly, a processor of the device (e.g., processor 202 of device 104) may be configured to analyze historical touch input data (e.g., the locations of previous or historical touch inputs to touch control interface 600) in combination with the current state of the device to determine anticipated touch point locations or regions. Then touch control electrodes 604 that do not fall within those regions may be selected by radio controller 660 to be utilized as antennas for wireless communications.

Once such approach for analyzing historical touch input data as well as device status may include a machine learning engine trained on historical data to predict future touch input locations. Such a machine learning engine may be trained to analyze historical touch input data as well as device state to identify a number of features. Features may include, for example, touch input location and device state information at the time the touch input was detected, such device state information may include programs being executed by the device, a battery status of the device, a network status (e.g., is the device connected to a network), an output volume of the device at the time the touch input was detected, a display screen brightness, an age of the device (users may change settings less frequently as they become more familiar with a device and have configured the device as they wish), and the like. One identified, these features can be compared to models created using extracted data from "training" data to generate a set of anticipated or up-coming touch input locations.

The machine learning engine may be continuously executed by the device's processor to generate a stream of anticipated future touch point locations. The anticipated future touch point locations can be provided to radio controller 660 enabling radio controller to select touch control electrodes 604 for use as antennas, where the selected touch control electrodes 604 do not lay underneath the anticipated touch point locations.

In other embodiments of system 650, radio controller 660 may be configured to use other combinations of touch control electrodes 604 as antennas. The various touch control electrodes 604 may be used as antennas at the same time. Alternatively, radio controller 660 may be configured (e.g., using switch 668) to selectively electrically connect to one of the touch control electrodes 604 to utilize a specific touch control electrode 604 as an antenna.

In an embodiment, a device includes a substrate, and a touch control interface including a plurality of touch control electrodes laminated onto the substrate, each touch control electrode in the plurality of touch control electrodes including a conductive material, and a touch controller electrically connected to each touch control electrode in the plurality of touch control electrodes. The touch controller is configured to detect a change in a capacitance of a first touch control electrode to determine that a user is touching the first touch control electrode. The device includes a high-pass filter connected to the first touch control electrode. The high-pass filter is configured to reduce a magnitude of a component of a signal passing through the high-pass filter having a frequency less than 600 megahertz. The device includes an impedance matching network electrically connected to the high-pass filter and a radio controller connected to the impedance matching network. The radio controller is configured to use the first touch control electrode as a first antenna to transmit and receive wireless signals. The impedance matching network is configured to match an input impedance of the first touch control electrode to an output impedance of the radio controller.

In another embodiment, a device includes a touch control system including a first electrode, and a touch controller configured to detect a touch input received at the first electrode. The device includes a radio controller electrically coupled to the first electrode. The radio controller is configured to use the first electrode as a first antenna to transmit and receive wireless signals.

In another embodiment, a device includes a touch control electrode and a radio controller coupled to the touch control electrode. The radio controller is configured to transmit a radio frequency signal using the touch control electrode.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A device, comprising:
    a substrate;
    a touch control interface including:
        a plurality of touch control electrodes laminated onto the substrate, each touch control electrode in the plurality of touch control electrodes including a conductive material, and
        a touch controller electrically connected to each touch control electrode in the plurality of touch control electrodes, the touch controller being configured to detect a change in a capacitance of a first touch control electrode to determine that a user is touching the first touch control electrode;
    a high-pass filter connected to the first touch control electrode, the high-pass filter having a cutoff frequency greater than or equal to 600 megahertz
    an impedance matching network electrically connected to the high-pass filter; and
    a radio controller connected to the impedance matching network, the radio controller being configured to use the first touch control electrode as a first antenna to transmit and receive wireless signals, wherein the impedance matching network is configured to match an input impedance of the first touch control electrode to an output impedance of the radio controller.

2. The device of claim 1, further comprising a low-pass filter connected between the touch controller and the first touch control electrode, the low-pass filter being configured to reduce a magnitude of a component of a second signal passing through the low-pass filter having a frequency greater than 100 megahertz to remove wireless communication signals encoded according to an 802.11 communication protocol from the second signal.

3. The device of claim 1, wherein the radio controller is electrically connected to a second touch control electrode and the radio controller is configured to implement a 2×2 communication scheme to concurrently transmit a first wireless signal using the first antenna and a second wireless signal using the second touch control electrode as a second antenna, the first wireless signal being different from the second wireless signal.

4. The device of claim 1, wherein the radio controller is electrically connected to a second touch control electrode and the radio controller is configured to:
    receive a touch control notification from the touch controller indicating a touch input at the first touch control electrode;
    cease use of the first antenna to transmit or receive the wireless signals; and
    use the second touch control electrode as a second antenna to transmit or receive the wireless signals.

5. A device comprising:
    a touch control system including:
        a first electrode, and
        a touch controller configured to detect a touch input received at the first electrode; and
    a radio controller electrically coupled to the first electrode, the radio controller configured to use the first electrode as a first antenna to transmit and receive wireless signals, wherein the radio controller is electrically coupled to a second electrode and the radio controller is configured to use the second electrode as a second antenna to transmit and receive the wireless signals, and wherein the radio controller is configured to concurrently transmit a first wireless signal using the first antenna and a second wireless signal using the second antenna, the first wireless signal being different from the second wireless signal.

6. The device of claim 5, further comprising a high-pass filter coupled between the radio controller and the first electrode, wherein a cutoff frequency of the high-pass filter is greater than or equal to 600 megahertz.

7. The device of claim 5, further comprising an impedance matching network coupled to the first electrode and the radio controller, wherein the impedance matching network is configured to match an input impedance of the first electrode to an output impedance of the radio controller.

8. The device of claim 5, further comprising a low-pass filter coupled to the touch controller and the first electrode, wherein a cutoff frequency of the low-pass filter is less than or equal to 100 megahertz.

9. The device of claim 5, wherein the radio controller is configured to:
  receive a notification from the touch controller indicating a touch input at the first electrode;
  cease use of the first electrode as the first antenna to transmit and receive the wireless signals; and
  use the second electrode to transmit and receive the wireless signals.

10. The device of claim 5, wherein the touch control system further includes a second electrode and the radio controller is configured to:
  receive, from the touch controller, information indicative that the touch input was received only at the first electrode; and
  use the second electrode to transmit and/or receive the wireless signals.

11. The device of claim 5, wherein the touch controller is configured to:
  receive, at a first time, first signal power data from the radio controller, the first signal power data identifying a first received signal strength of a first signal received at the first electrode;
  detect, at a second time after the first time, a signal at the first electrode, wherein the signal is associated with the touch input;
  receive, at a third time after the second time, second signal power data from the radio controller, the second signal power data identifying a second received signal strength of a second signal received at the first electrode;
  determine that a difference between the first signal power data and the second signal power data is greater than a threshold value; and
  transmit a notification to the radio controller indicating that the touch input was detected at the first electrode.

12. A device, comprising:
  a first touch control electrode;
  a second touch control electrode; and
  a radio controller coupled to the first touch control electrode and the second touch control electrode, the radio controller being configured to:
    transmit a radio frequency signal using the first touch control electrode;
    receive a notification indicating a touch input at the first touch control electrode, wherein the notification is generated in response to the touch input; and
    upon receiving the notification, transmit the radio frequency signal using the second touch control electrode.

13. The device of claim 12, further comprising a high-pass filter coupled between the radio controller and the first touch control electrode, wherein a cutoff frequency of the high-pass filter is greater than or equal to 600 megahertz.

14. The device of claim 12, further comprising an impedance matching network coupled between the radio controller and the first touch control electrode.

15. The device of claim 12, further comprising:
  a touch controller coupled to the first touch control electrode; and
  a low-pass filter coupled between the touch controller and the first touch control electrode, wherein a cutoff frequency of the low-pass filter is less than or equal to 100 megahertz.

16. The device of claim 12, wherein the radio controller is configured to concurrently transmit a first wireless signal using the first touch control electrode and a second wireless signal using the second touch control electrode, wherein the second wireless signal is different from the first wireless signal.

* * * * *